United States Patent
Chien et al.

(10) Patent No.: US 10,327,008 B2
(45) Date of Patent: Jun. 18, 2019

(54) ADAPTIVE MOTION VECTOR RESOLUTION SIGNALING FOR VIDEO CODING

(75) Inventors: Wei-Jung Chien, San Diego, CA (US); Peisong Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2119 days.

(21) Appl. No.: 13/247,785

(22) Filed: Sep. 28, 2011

(65) Prior Publication Data
US 2012/0093226 A1    Apr. 19, 2012

Related U.S. Application Data

(60) Provisional application No. 61/392,892, filed on Oct. 13, 2010, provisional application No. 61/499,956, filed on Jun. 22, 2011.

(51) Int. Cl.
*H04N 19/13* (2014.01)
*H04N 19/523* (2014.01)
(Continued)

(52) U.S. Cl.
CPC ........... *H04N 19/523* (2014.11); *H04N 19/13* (2014.11); *H04N 19/139* (2014.11);
(Continued)

(58) Field of Classification Search
CPC ........ H04N 19/0063; H04N 19/00151; H04N 19/00739; H04N 19/0023;
(Continued)

(56) References Cited

U.S. PATENT DOCUMENTS

| 5,737,022 A | 4/1998 | Yamaguchi et al. |
| 6,968,008 B1 | 11/2005 | Ribas-Corbera et al. |

(Continued)

FOREIGN PATENT DOCUMENTS

| CN | 1206993 A | 2/1999 |
| CN | 1396774 A | 2/2003 |

(Continued)

OTHER PUBLICATIONS

SK Telecom, Description of video coding technology proposal, Apr. 13, 2010, JCTVC meeting, http://wftp3.itu.int/av-arch/jctvc-site.*

(Continued)

*Primary Examiner* — Nguyen T Truong
(74) *Attorney, Agent, or Firm* — Shumaker & Sieffert, P.A.

(57) ABSTRACT

A video encoder may be configured to adaptively select a sub-pixel precision for motion vectors used to encode video data. The video encoder may further entropy encode an indication of the sub-pixel precision using context adaptive binary arithmetic coding, where the context may correspond to the size of a block of video data for the motion vector. For example, the size may correspond to the depth of a coding unit, the size of a prediction unit of the coding unit, and/or a type for the prediction unit. The video encoder may also interpolate values for one-sixteenth pixel positions of chrominance data using bilinear interpolation. The video encoder may further encode a motion vector difference value for the motion vector using an encoding scheme corresponding to the sub-pixel precision of the motion vector. A video decoder may use similar, reciprocal techniques for decoding the video data.

51 Claims, 10 Drawing Sheets

(51) Int. Cl.
*H04N 19/139* (2014.01)
*H04N 19/463* (2014.01)
*H04N 19/176* (2014.01)
*H04N 19/91* (2014.01)

(52) U.S. Cl.
CPC ......... *H04N 19/176* (2014.11); *H04N 19/463* (2014.11); *H04N 19/91* (2014.11)

(58) Field of Classification Search
CPC ....... H04N 19/00696; H04N 19/00024; H04N 19/00545; H04N 19/00254; H04N 19/00551
USPC .................................................... 375/240.16
See application file for complete search history.

(56) References Cited

U.S. PATENT DOCUMENTS

| | | |
|---|---|---|
| 7,599,438 B2 | 10/2009 | Holcomb et al. |
| 7,728,878 B2 | 6/2010 | Yea et al. |
| 8,175,159 B2 | 5/2012 | Suzuki |
| 2005/0243921 A1 | 11/2005 | Au et al. |
| 2006/0133507 A1 | 6/2006 | Lim et al. |
| 2007/0019724 A1 | 1/2007 | Tourapis et al. |
| 2007/0127572 A1 | 6/2007 | Sasai et al. |
| 2008/0084930 A1 | 4/2008 | Sekiguchi et al. |
| 2008/0253459 A1 | 10/2008 | Ugur et al. |
| 2008/0267289 A1 | 10/2008 | Yu et al. |
| 2008/0310511 A1 | 12/2008 | Suzuki |
| 2009/0092189 A1 | 4/2009 | Tsuchiya et al. |
| 2009/0244299 A1 | 10/2009 | Fukunishi |
| 2009/0257668 A1 | 10/2009 | Ye et al. |
| 2009/0274215 A1 | 11/2009 | Metsugi |
| 2010/0104020 A1 | 4/2010 | Ju |
| 2010/0226434 A1 | 9/2010 | Lee et al. |
| 2011/0032991 A1 | 2/2011 | Sekiguchi et al. |
| 2011/0206125 A1 | 8/2011 | Chien et al. |
| 2012/0051431 A1 | 3/2012 | Chien et al. |
| 2012/0057632 A1 | 3/2012 | Sato |
| 2012/0201293 A1 | 8/2012 | Guo et al. |

FOREIGN PATENT DOCUMENTS

| | | |
|---|---|---|
| CN | 1545321 A | 11/2004 |
| CN | 1627825 A | 6/2005 |
| CN | 1245031 C | 3/2006 |
| CN | 1787641 A | 6/2006 |
| CN | 1984336 A | 6/2007 |
| CN | 101043621 A | 9/2007 |
| CN | 101631245 A | 1/2010 |
| EP | 1469682 A1 | 10/2004 |
| EP | 1962514 A1 | 8/2008 |
| JP | 2003319400 A | 11/2003 |
| JP | 2004007337 A | 1/2004 |
| JP | 2004186839 A | 7/2004 |
| JP | 2009171608 A | 7/2009 |
| JP | 2010016453 A | 1/2010 |
| KR | 20030096504 A | 12/2003 |
| WO | 2005076630 A1 | 8/2005 |
| WO | 2005104559 A1 | 11/2005 |
| WO | 2008/122956 A2 | 10/2008 |
| WO | 2009088038 A1 | 7/2009 |
| WO | 2010101064 A1 | 9/2010 |
| WO | 2011/103206 A1 | 8/2011 |

OTHER PUBLICATIONS

Lim et al., "Description of video coding technology proposal by SK telecom, Sejong Univ. and Sungkyunkwan Univ.," Document: JCTVC-A113, Dresden, DE, Apr. 15-23, 2010, 41 pp.

ITU-T H.264, Series H: Audiovisual and Multimedia Systems, Infrastructure of audiovisual services—Coding of moving video, Advanced video coding for generic audiovisual services, Mar. 2010, 669 pp.

McCann et al., "Samsung's Response to the Call for Proposals on Video Compression Technology," Document: JCTVC-A124, Dresden, DE, Apr. 15-23, 2010, 42 pp.

Chen et al., "Prediction based Directional Refinement (PDR) algorithm for Fractional Pixel Motion Search Strategy," Document JVT-D069-d2, 4th Meeting: Klagenfurt, Austria, Jul. 22-26, 2002, 12 pp.

Ostermann et al., "Motion compensated prediction with ⅛-pel displacement vector resolution," ITU-T Q.6/SG16, Document VCEG-AD09, Hangzhou, China, Oct. 23-27, 2006., 7 pp.

Karczewicz et al., "Single Pass Encoding using Switched Interpolation Filters with Offset," Document VCEG-AJ29, 36th Meeting: San Diego, California, Oct. 8-10, 2008, 4 pp.

Said, "Introduction to Arithmetic Coding—Theory and Practice," HP Laboratories Palo Alto, Palo Alto, CA, Apr. 21, 2004, 67 pp.

Bjontegaard et al., "H.26L Core Experiment on Adaptive Motion Accuracy (AMA( for ½, ¼, and ⅛ Sample Accuracy Motion Compensation," Document Q15-J-09, ITU Study Group 16—Video Coding Experts Group—ISO/IEC MPEG & ITU-T VCEG(ISO/IEC JTC1/SC29/WG11 and ITU-T SG16 Q6), Tenth Meeting, Osaka, JP, Mar. 2, 2000, 9 pp.

Karczewicz et al., "Video Coding Technology Proposal by Qualcomm Inc.," Document: JCTVC-A121, 1st meeting of ITU-T SG16 WP3 and ISO/IEC JTC1/SC29/WG11, Dresden, DE Apr. 15-23, 2010.

International Search Report for PCT/US2011/025113, dated Jun. 17, 2011, 14 pp.

U.S. Appl. No. 13/172,496 to Chien et al., entitled "Motion Direction Based Adaptive Motion Vector Resolution Signaling for Video Coding," filed Jun. 29, 2011.

Anonymous: "Text of ISO/IEC IS 14496-10:201X (6th edition)", 91 MPEG Meeting; Jan. 18, 2010-Jan. 22, 2010; Kyoto; (Motion Picture Expertgroup or ISO/IEC JTC1/SC29/WG11), No. N11084, Apr. 16, 2010 (Apr. 16, 2010), pp. 1-110, XP002662630, ISSN: 0000-0030.

Gisle Bjontegaard et al: "H.26L Core Experiment on Adaptive Motion Accuracy (AMA) for ½, ¼, and ⅛ Sample Accuracy Motion Compensation", ITU Study Group 16—Video Coding Experts Group—ISO/IEC MPEG & ITU-T VCEG(ISO/IEC JTC1/SC29/WG11 and ITU-T SG16 Q6), No. q15j09, Mar. 6, 2000 (Mar. 6, 2000), XP030003040.

Karczewicz, et al., "Video Coding Technology Proposal by Qualcomm Inc." (JCTVC-A121) Joint Collaborative Team on Video Coding (JCT-VC) of ITU-T SG16 WP3 and ISO/IECJTC1/SC29/WG11, 1st Meeting [Online] Apr. 15-23 2010, pp. 1-24.

Thomas Wedi et al: "⅛-pel motion vector resolution for H.26L", ITU Study Group 16—Video Coding Experts Group—ISO/IEC MPEG & ITU-T VCEG (ISO/IEC JTC1/SC29/WG11 and ITU-T SG16 Q6), No. q15k21, Aug. 15, 2000 (Aug. 15, 2000), XP030003114.

U.S. Appl. No. 12/945,170, filed Nov. 11, 2010, entitled "Adapting Motion Resolution for Video Coding," Chien et al.

Marpe, D., et al., "The H.264/MPEG4 Advanced Video Coding Standard and its Applications," Standards Report, IEEE Communications Magazine, Aug. 2006, pp. 134-143.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

International Preliminary Report on Patentability—PCT/US2011/054629, The International Bureau of WIPO—Geneva, Switzerland, dated Dec. 11, 2012, 38 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand, T., et al., "WD2: Working Draft 2 of High-Efficiency Video Coding", Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012].

(56) References Cited

OTHER PUBLICATIONS

Wiegand, T., et al., "WD1: Working Draft 3 of High-Efficiency Video Coding", Document JCTVC-E603, 5th Meeting: Geneva, CH, Mar. 16-23, 2011, pp. 193.

Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.

Second Written Opinion of international application No. PCT/US2011/054629, dated Oct. 24, 2012, 6 pp.

Bjontegaard et al., "H.26L Core Experiment on Adaptive Motion Accuracy (AMA( for ½, ¼, and ⅛ Sample Accuracy Motion Compensation," Document Q15-J-09, ITU Study Group 16—Video Coding Experts Group—ISO/IEC MPEG & ITU-T VCEG(ISO/IEC JTC1/SC29/WG11 and ITU-T SG16 Q6), Tenth Meeting. Osaka, JP, Mar. 2, 2000, 2 pages.

Thomas Wedi et al: "⅛-pel motion vector resolution for H.26L", ITU Study Group 16—Video Coding Experts Group—ISO/IEC MPEG & ITU-T VCEG (ISO/IEC JTC1/SC29/WG11 and ITU-T SG16 Q6), XX, XX, No. q15k21, Aug. 15, 2000 (Aug. 15, 2000), XP030003114.

Invitation to Pay Additional Fees including Partial International Search Report of international application No. PCT/US2011/054629 dated Dec. 22, 2011, 9 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

Amonou, I. et al., "Description of video coding technology proposal by France Telecom, NTT, NTT DOCOMO, Panasonic, and Technicolor," Joint Collaborative Team on Video Coding, Document JCTVC-A114, Apr. 15-23, 2010, 42 pp.

International Search Report and Written Opinion of international application No. PCT/US2011/054629, dated Feb. 13, 2012, 23 pp.

Nakagawa, A. et al., "Context-based motion vector coding with 2-Dimensional VLC," Joint Collaborative Team on Video Coding, Document JVT-C097, May 6-10, 2002, 10 pp.

Chien W., et al., "TE 12: Evaluation of Adaptive Motion Vector Resolution (AMVRES)," Joint Collaborative Team on Video Coding (JCT-VC) of ITU-T SG16 WP3 and ISO/IEC JTC1/SC29/WG11 3rd Meeting: Guangzhou, CN, Oct. 2, 2010, JCTVC-C265, pp. 1-3, URL, http://phenix.int-evry.fr/jct/doc_end_user/current_document.php?id=1368.

Chien, W.-J. et. al., "CE12: Adaptive Motion Vector Resolution from Qualcomm", JCTVC-D394, Daegu, KR, Jan. 2011, 4 pp.

Ugur et al., "Adaptive MV resolution with directional filters," Document JCTVC-C215, 3rd Meeting: Guangzhou, CN, Oct. 7-15, 2010, 4 pp.

Wedi T, "Advanced Motion Compensated Prediction Methods", [online], Oct. 29, 2004, ITU-T Video Coding Experts Group (ITU-T SG16 Q.6), Document: VCEG-X10, [Searched on Oct. 30, 2013], Internet , 8 pages.

Wedi T. et al., "Motion- and Aliasing-Compensated Prediction for Hybrid Video Coding", IEEE Transactions on Circuits and Systems for Video Technology, vol. 13, Issue 7, Jul. 2003, pp. 577-586.

Wedi T., "1/8-pel Motion Vector Resolution for Interlaced Video Coding", Joint Video Team (JVT) of ISO/IEC MPEG & ITU-T VCEG (ISO/IEC JTC1/SC29/WG11 and ITU-T SG16 Q.6), JVT-B066, VCEG, 2002, 7 pages.

\* cited by examiner

FIG. 4

US 10,327,008 B2

ADAPTIVE MOTION VECTOR RESOLUTION SIGNALING FOR VIDEO CODING

This application claims the benefit of U.S. Provisional Application No. 61/392,892, filed Oct. 13, 2010 and U.S. Provisional Application No. 61/499,956, filed Jun. 22, 2011, which are hereby incorporated by reference in their entirety.

CROSS-REFERENCE TO RELATED APPLICATIONS

The present Application for Patent is related to the following co-pending U.S. Patent Applications:
"ADAPTING MOTION RESOLUTION FOR VIDEO CODING" by Chien et al., U.S. Ser. No. 12/945,170, filed Nov. 12, 2010, assigned to the assignee hereof, and expressly incorporated by reference herein; and
"MOTION DIRECTION BASED ADAPTIVE MOTION VECTOR RESOLUTION SIGNALING FOR VIDEO CODING" by Chien et al., U.S. Ser. No. 13/172,496, filed Jun. 29, 2011, assigned to the assignee hereof, and expressly incorporated by reference herein.

TECHNICAL FIELD

This disclosure relates to video coding and, more particularly, to inter-prediction video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

SUMMARY

In general, this disclosure describes techniques for supporting adaptive motion vector resolution during video coding, e.g., adaptive motion vector resolution selection for motion estimation and motion compensation. For example, a video encoder may be configured to select different levels of sub-integer pixel precision, e.g., either one-eighth pixel precision or one-quarter pixel precision, for a motion vector when encoding a block of video data. That is, a motion vector for the block produced by the video encoder may have one-eighth pixel precision or one-quarter pixel precision, based on the selection. The video encoder may signal selection of one-eighth pixel precision or one-quarter pixel precision for the motion vector using the techniques of this disclosure.

As an example, the video encoder may entropy encode a value representative of whether the motion vector has one-quarter or one-eighth pixel precision using context-adaptive binary arithmetic coding (CABAC). To entropy encode the value, the video encoder may select a probability model based on a context related to the size of a block of video data. The context may be determined based on any or all of a depth for a coding unit, a size of a prediction unit for the coding unit, and/or a type for the prediction unit, where the type may specify a shape of the prediction unit relative to the size of the coding unit. The video encoder may further be configured to entropy encode the motion vector itself using various schemes, based on the sub-integer pixel precision of the motion vector (e.g., one-quarter or one-eighth pixel precision). The video encoder may also be configured to calculate values of one-sixteenth pixel positions of chrominance data for a coding unit using bilinear interpolation, when the video encoder calculates a motion vector for luminance data of the coding unit having one-eighth pixel precision.

In one example, a method of encoding video data includes encoding a prediction unit of a coding unit of video data using a motion vector having one of a first sub-pixel precision or a second, different sub-pixel precision, determining a context for encoding an indication of whether the motion vector has the first sub-pixel precision or the second sub-pixel precision using context adaptive binary arithmetic coding, wherein the context comprises at least one of a depth of the coding unit, a size of the prediction unit, and a type for the prediction unit, and entropy encoding the indication using the determined context in accordance with context adaptive binary arithmetic coding.

In another example, a method of encoding video data includes encoding luminance data of a coding unit of video data using a motion vector having one-eighth-pixel precision for the luminance data, calculating, using bilinear interpolation, values of one-sixteenth pixel positions of chrominance data of a reference block identified by the motion vector, and encoding chrominance data of the coding unit based on the bilinear interpolated values of the reference block.

In another example, a method of encoding video data includes calculating a first motion vector difference value when encoding a first prediction unit of video data, the first motion vector difference value having a first sub-pixel precision, encoding the first motion vector difference value using a first motion vector difference encoding scheme, wherein the first motion vector difference encoding scheme is associated with the first sub-pixel precision, calculating a second motion vector difference value when encoding a second prediction unit of the video data, the second motion vector difference value having a second, different sub-pixel precision, and encoding the second motion vector difference value using a second motion vector difference encoding scheme, wherein the second motion vector difference encoding scheme is associated with the second sub-pixel precision.

In another example, an apparatus for encoding video data includes a video encoder configured to encode a prediction unit of a coding unit of video data using a motion vector having one of a first sub-pixel precision or a second, different sub-pixel precision, determine a context for encoding an indication of whether the motion vector has the first sub-pixel precision or the second sub-pixel precision using context adaptive binary arithmetic coding, wherein the context comprises at least one of a depth of the coding unit, a size of the prediction unit, and a type for the prediction unit, and entropy encode the indication using the determined context in accordance with context adaptive binary arithmetic coding.

In another example, an apparatus for encoding video data includes means for encoding a prediction unit of a coding unit of video data using a motion vector having one of a first sub-pixel precision or a second, different sub-pixel precision, means for determining a context for encoding an indication of whether the motion vector has the first sub-pixel precision or the second sub-pixel precision using context adaptive binary arithmetic coding, wherein the context comprises at least one of a depth of the coding unit, a size of the prediction unit, and a type for the prediction unit, and means for entropy encoding the indication using the determined context in accordance with context adaptive binary arithmetic coding.

In another example, a computer program product includes a computer-readable storage medium having stored thereon instructions that, when executed, cause a processor of a device for encoding video data to encode a prediction unit of a coding unit of video data using a motion vector having one of a first sub-pixel precision or a second, different sub-pixel precision, determine a context for encoding an indication of whether the motion vector has the first sub-pixel precision or the second sub-pixel precision using context adaptive binary arithmetic coding, wherein the context comprises at least one of a depth of the coding unit, a size of the prediction unit, and a type for the prediction unit, and entropy encode the indication using the determined context in accordance with context adaptive binary arithmetic coding.

In another example, a method of decoding video data includes receiving an encoded prediction unit of a coding unit of video data that was encoded using a motion vector having one of a first sub-pixel precision or a second, different sub-pixel precision, receiving a context adaptive binary arithmetic coded indication of whether the motion vector has the first sub-pixel precision or the second sub-pixel precision, determining a context for decoding the indication, wherein the context comprises at least one of a depth of the coding unit, a size of the prediction unit, and a type for the prediction unit, and entropy decoding the indication using the determined context in accordance with context adaptive binary arithmetic coding.

In another example, a method of decoding video data includes receiving a motion vector having one-eighth-pixel precision for luminance data of a coding unit of video data, calculating, using bilinear interpolation, values of one-sixteenth pixel positions of chrominance data of a reference block identified by the motion vector, and decoding chrominance data of the coding unit based on the bilinear interpolated values of the reference block.

In another example, a method of decoding video data includes receiving a first motion vector difference value for a first prediction unit of video data, the first motion vector difference value having a first sub-pixel precision, decoding the first motion vector difference value using a first motion vector difference encoding scheme, wherein the first motion vector difference decoding scheme is associated with the first sub-pixel precision, receiving a second motion vector difference value for a second prediction unit of the video data, the second motion vector difference value having a second, different sub-pixel precision, and decoding the second motion vector difference value using a second motion vector difference decoding scheme, wherein the second motion vector difference decoding scheme is associated with the second sub-pixel precision.

In another example, an apparatus for decoding video data includes a video decoder configured to receive an encoded prediction unit of a coding unit of video data that was encoded using a motion vector having one of a first sub-pixel precision or a second, different sub-pixel precision, receive a context adaptive binary arithmetic coded indication of whether the motion vector has the first sub-pixel precision or the second sub-pixel precision, determine a context for decoding the indication, wherein the context comprises at least one of a depth of the coding unit, a size of the prediction unit, and a type for the prediction unit, and entropy decode the indication using the determined context in accordance with context adaptive binary arithmetic coding.

In another example, an apparatus for decoding video data includes means for receiving an encoded prediction unit of a coding unit of video data that was encoded using a motion vector having one of a first sub-pixel precision or a second, different sub-pixel precision, means for receiving a context adaptive binary arithmetic coded indication of whether the motion vector has the first sub-pixel precision or the second sub-pixel precision, means for determining a context for decoding the indication, wherein the context comprises at least one of a depth of the coding unit, a size of the prediction unit, and a type for the prediction unit, and means for entropy decoding the indication using the determined context in accordance with context adaptive binary arithmetic coding.

In another example, a computer program product includes a computer-readable storage medium having stored thereon instructions that, when executed, cause a processor of a device for decoding video data to receive an encoded prediction unit of a coding unit of video data that was encoded using a motion vector having one of a first sub-pixel precision or a second, different sub-pixel precision, receive a context adaptive binary arithmetic coded indication of whether the motion vector has the first sub-pixel precision or the second sub-pixel precision, determine a context for decoding the indication, wherein the context comprises at least one of a depth of the coding unit, a size of the prediction unit, and a type for the prediction unit, and entropy decode the indication using the determined context in accordance with context adaptive binary arithmetic coding.

The details of one or more examples are set forth in the accompanying drawings and the description below. Other features, objects, and advantages will be apparent from the description and drawings, and from the claims.

BRIEF DESCRIPTION OF DRAWINGS

FIG. 4 is a conceptual diagram illustrating fractional pixel positions for a full pixel position.

DETAILED DESCRIPTION

Figure 1:
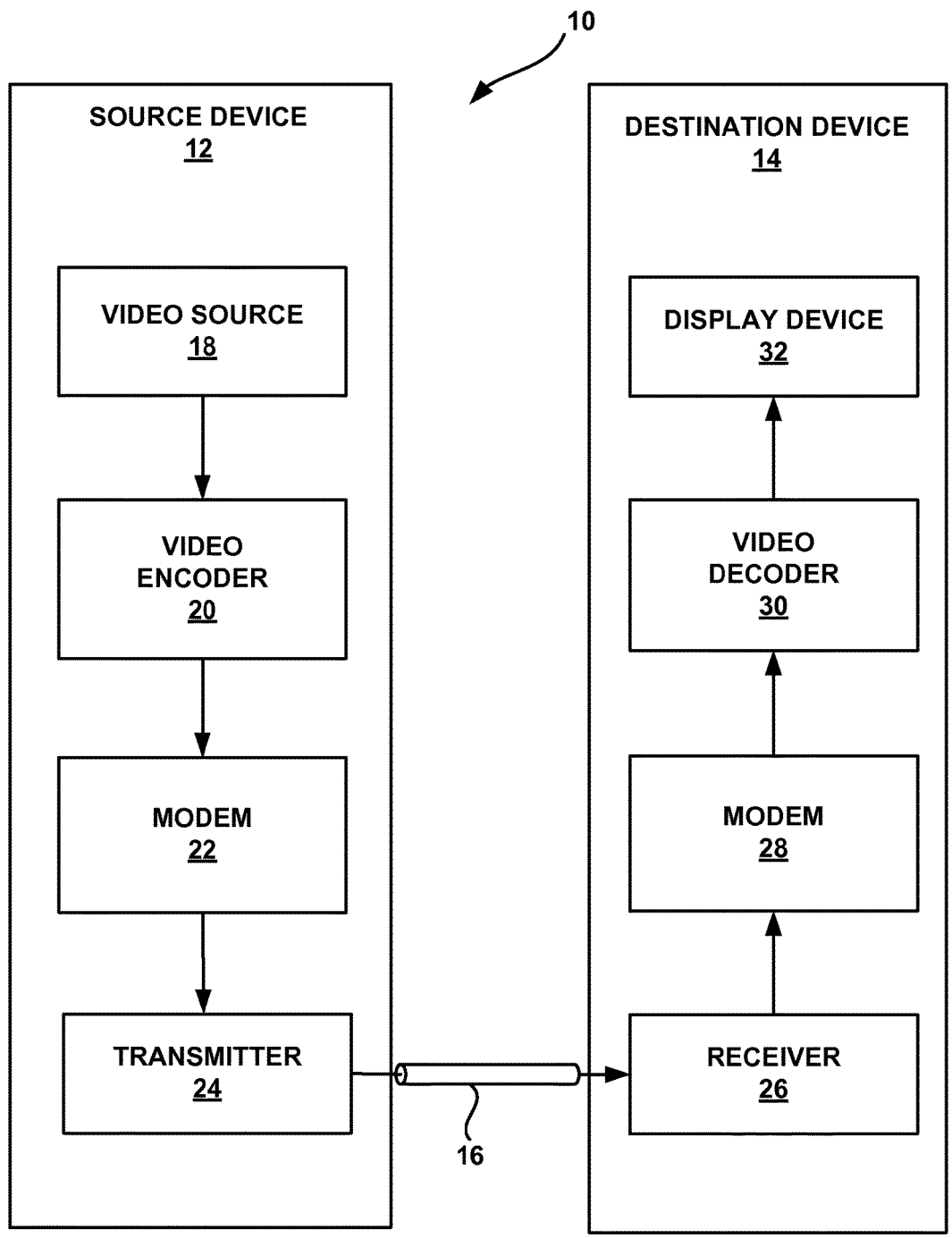
FIG. 1 is a block diagram illustrating an example video encoding and decoding system that may utilize the techniques of this disclosure for supporting adaptive motion vector resolution.

In general, this disclosure describes techniques for adaptively selecting motion vector precision for motion vectors used to encode blocks of video data, and signaling the selected motion vector precision for the motion vectors. The techniques may include adaptively selecting between different levels of sub-integer pixel precision, sometimes referred to as fractional pixel precision. For example, the techniques may include adaptively selecting between one-quarter pixel precision and one-eighth pixel precision for motion vectors used to encode blocks of video data. The term "eighth-pixel" precision in this disclosure is intended to refer to precision of one-eighth ($\frac{1}{8}^{th}$) of a pixel, e.g., one of: the full pixel position ($\frac{0}{8}$), one-eighth of a pixel ($\frac{1}{8}$), two-eighths of a pixel ($\frac{2}{8}$, also one-quarter of a pixel), three-eighths of a pixel ($\frac{3}{8}$), four-eighths of a pixel ($\frac{4}{8}$, also one-half of a pixel and two-quarters of a pixel), five-eighths of a pixel ($\frac{5}{8}$), six-eighths of a pixel ($\frac{6}{8}$, also three-quarters of a pixel), or seven-eighths of a pixel ($\frac{7}{8}$).

Conventional H.264 encoders and decoders support motion vectors having one-quarter-pixel precision. In some instances, one-eighth-pixel precision may provide certain advantages over one-quarter-pixel precision. However, encoding every motion vector to one-eighth-pixel precision may require too many coding bits that may outweigh the benefits of one-eighth-pixel precision motion vectors. The techniques of this disclosure include using one-eighth-pixel precision motion vectors when appropriate, otherwise using one-quarter-pixel precision motion vectors, and signaling whether a motion vector has one-eighth-pixel precision or one-quarter-pixel precision, so that a decoder may determine the precision used by the encoder for particular blocks.

To avoid adding a full bit to the bitstream for each motion vector as a flag indicating whether the motion vector has, e.g., one-quarter or one-eighth pixel precision, this disclosure proposes encoding an indication of the sub-pixel precision for the motion vector using a binary arithmetic coding scheme, such as context-adaptive binary arithmetic coding (CABAC). CABAC provides techniques for encoding fractional bits of information based on a probability model that uses context information (e.g., nearby elements) to optimize a probability estimate. In accordance with the techniques of this disclosure, the context for encoding the indication of the sub-pixel precision of a motion vector for a block of video data (e.g., a prediction unit of a coding unit) may correspond to size information for the block.

Size information for a prediction unit (PU) of a coding unit may be derived from one or more sources. In accordance with High Efficiency Video Coding (HEVC), a picture of video data includes a plurality of largest coding units (LCUs), which are conceptually similar to macroblocks in ITU-T H.264/AVC. LCUs may be partitioned into four sub-CUs (sub coding units), each of which may also be further partitioned into four sub-CUs. Assuming that a CU has a size of 2N×2N pixels, the CU may be partitioned into sub-CUs each having sizes of N×N pixels, and such that the sub-CUs are non-overlapping. One attribute of a CU is a "depth" of the CU, which generally corresponds to the number of partitions made to arrive at the current CU. For example, assuming the LCU has a size of 2N×2N, and a current CU (comprising a sub-CU of the LCU) has a size of N/4, the depth for the current CU would be 3.

In this manner, the depth of a coding unit can be determined according to the following formula:

$$\text{depth}(CU) = \log_2\left(\frac{\text{size}(LCU)}{\text{size}(CU)}\right) \quad (1)$$

where the LCU and CU are assumed to have equal numbers of pixels horizontally and vertically, size (CU) returns a number of horizontal pixels for the CU, and the CU forms a sub-CU of the LCU. Moreover, the size of a CU can be determined based on the depth for the CU, assuming that the size of the LCU including the CU as a sub-CU is known, according to the following formula:

$$\text{size}(CU) = \frac{\text{size}(LCU)}{2^{\text{depth}(CU)}} \quad (2)$$

The size information for the prediction unit may also include size information for the prediction unit itself. For example, the size information may correspond to a number of horizontal and/or vertical pixels of the prediction unit. The size information may also include an indication of a type for the prediction unit. The type may correspond to a shape and size of the prediction unit relative to the size of the CU including the prediction unit. For example, assuming that the CU has a size of 2N×2N pixels, symmetric prediction unit types may include 2N×2N, 2N×N, N×2N, or N×N, while asymmetric prediction unit types may include 2N×nU, 2N×nD, nL×2N, and nR×2N.

In the asymmetric types, "nX" refers to a split of 0.5N and 1.5N along the direction corresponding to X, where X=U refers to the upper portion of the PU having a height of 0.5N, X=D refers to the lower portion of the PU having a height of 0.5N, X=L refers to the left portion of the PU having a width of 0.5N, and X=R refers to the right portion of the PU having a width of 0.5N. For example, for a CU of 2N×2N pixels having a PU split as a 2N×nU type, an upper asymmetric PU for the CU would have a size of 2N×0.5N pixels, while a lower asymmetric PU for the CU would have a size of 2N×1.5N pixels.

In this manner, the context for encoding an indication of a sub-pixel precision for a motion vector for a PU of a CU may include any or all of a size of the CU (which may be described as a depth for the CU relative to an LCU including the CU), and a size of the PU, which may be described in terms of pixel dimensions for the PU and/or relative to the size of the CU (e.g., using a type for the prediction unit). As an example, the motion vector for the PU may have either one-eighth pixel precision or one-quarter pixel precision, and the indication may comprise a one-bit flag indicating whether the motion vector has one-eighth pixel precision or one-quarter pixel precision. In other examples, other precisions may be available.

The sub-pixel precision for the motion vector may be indicated relative to luminance data of a CU. Generally, chrominance data of a CU has a lower spatial resolution than luminance data of the CU. For example, the chrominance data may have one-half of the resolution of the luminance data, both horizontally and vertically. However, the motion vector calculated for the luminance data may be reused to encode the chrominance data. Therefore, the motion vector may have a higher precision for chrominance data of a CU than luminance data of the CU. For example, if the motion vector has one-eighth pixel precision for luminance data, and the chrominance data has one-half of the horizontal and vertical resolution of the luminance data, then the motion vector may have one-sixteenth pixel precision for the chrominance data. This disclosure proposes calculating values for one-sixteenth pixel positions of chrominance data using bilinear interpolation.

In addition to encoding luminance and chrominance data using a motion vector, the motion vector itself may be encoded. For example, a video encoder may encode the motion vector by calculating a difference between the motion vector and a motion predictor. The video encoder may select the motion predictor as a motion vector for a nearby block of video data. For example, the video encoder may select the median of the motion vectors as a motion predictor, and then calculate a motion vector difference as the difference between the motion vector for a prediction unit and the motion predictor. This disclosure further provides techniques for encoding the motion vector difference value for a prediction unit based on the sub-pixel precision of the motion vector for the prediction unit.

As an example, different motion vector difference encoding schemes may be defined for potential sub-pixel precisions of a motion vector. For example, when a motion vector may have either one-eighth pixel precision or one-quarter pixel precision, a first motion vector difference encoding scheme may be defined for one-eighth pixel precision, and a second motion vector difference encoding scheme may be defined for one-quarter pixel precision. In this manner, a video encoder may encode a motion vector difference value for a one-eighth pixel precision motion vector using the first motion vector difference encoding scheme, and a motion vector difference value for a one-quarter pixel precision motion vector using the second motion vector difference encoding scheme.

As one example, a motion vector difference encoding scheme may be defined to include a threshold specific to the encoding scheme. When a motion vector difference value is below the threshold, the motion vector difference value may be encoded using a first type of entropy encoding (e.g., unary coding), whereas when the motion vector difference is equal to or greater than the threshold, the motion vector difference value may be encoded using a second type of entropy encoding (e.g., golomb coding). The threshold may vary based on the sub-pixel precision for the motion vector corresponding to the motion vector difference value, e.g., one-quarter pixel precision or one-eighth pixel precision.

FIG. 1 is a block diagram illustrating an example video encoding and decoding system 10 that may utilize the techniques of this disclosure for supporting adaptive motion vector resolution. For example, system 10 may encode and decode an indication of a sub-pixel precision for a motion vector based on context information including a size of a block of video data corresponding to the motion vector. System 10 may also interpolate values for one-sixteenth sub-pixel positions of chrominance data using bilinear interpolation. System 10 may also utilize different motion vector difference coding schemes corresponding to sub-pixel precision for motion vectors corresponding to the motion vector differences.

As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless. The techniques of this disclosure, however, which generally concern techniques for supporting adaptive sub-pixel precision for motion vectors, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for supporting adaptive sub-pixel precision for motion vectors. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for supporting adaptive sub-pixel precision for motion vectors may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein for supporting adaptive sub-pixel precision for motion vectors. The information communicated over channel 16 may include syntax information defined by video encoder 20, which is also used by video decoder 30, that includes syntax elements that describe characteristics and/or processing of macroblocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/AVC, and to develop new standards, e.g., for HEVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a macroblock or a partition of a macroblock. The video blocks may have fixed or varying sizes, and may differ in size according to a specified coding standard. Each video frame may include a plurality of slices. Each slice may include a plurality of macroblocks, which may be arranged into partitions, also referred to as sub-blocks.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" may refer to any independently decodable unit of a video frame such as an entire frame, a slice of a frame, a group of pictures (GOP), also referred to as a sequence, or another independently decodable unit defined according to applicable coding techniques.

Efforts are currently in progress to develop a new video coding standard, currently referred to as High Efficiency Video Coding (HEVC). The upcoming standard is also referred to colloquially as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-three intra-prediction encoding modes.

HM refers to a block of video data as a coding unit (CU). Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, PU, or TU. Moreover, where this disclosure refers to examples involving a coding unit or CU, it should be understood that other examples may be provided with respect to macroblocks substituted for coding units.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split (e.g., corresponding to a leaf node in the quadtree data structure) may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the CU defining the PU(s) may also describe, for example, partitioning of the CU into one or more PUs. Partitioning modes may differ between whether the CU is uncoded, intra-prediction mode encoded, or inter-prediction mode encoded.

A CU having one or more PUs may also include one or more transform units (TUs). Following prediction using a PU, a video encoder may calculate a residual value for the portion of the CU corresponding to the PU. The residual value may be transformed, quantized, and scanned. A TU is not necessarily limited to the size of a PU. Thus, TUs may be larger or smaller than corresponding PUs for the same CU. In some examples, the maximum size of a TU may correspond to the size of the CU that includes the TU.

In accordance with the techniques of this disclosure, video encoder 20 may inter-mode encode a CU using one or more PUs having motion vectors of varying sub-integer pixel precision. For example, video encoder 20 may select between using a motion vector having one-quarter pixel precision or one-eighth pixel precision for a PU. Video encoder 20 may also provide an indication of the sub-pixel precision for a motion vector of a PU. Video encoder 20 may encode the indication using CABAC, and may select a context for encoding the indication of the sub-pixel precision using CABAC. The context may correspond to size information for the PU, e.g., a depth of a CU including the PU, a size of the PU, and/or a type for the PU.

The context may therefore correspond to size information for a PU. These techniques recognize that PUs may have different sizes at different CU depths. Statistics for the use of different motion vector resolutions (that is, sub-integer pixel precision for a motion vector) may be different for PUs of different sizes. For example, the likelihood of the use of motion vectors having one-quarter pixel precision may differ between different CU sizes, PU sizes, and PU types. Likewise, the likelihood of the use of motion vectors having one-eighth pixel precision may differ between different CU sizes, PU sizes, and PU types. Accordingly, this disclosure provides techniques for using independent context modeling depending on size information for the PU. Video encoder 20 may use one or more contexts for encoding an indication of the sub-integer pixel precision (e.g., adaptive motion vector resolution (AMVRES) flags) for motion vectors. The contexts may depend on CU depth (and may be shared by several CU depths), PU size (and can be shared by several PU sizes), and/or PU type (and can be shared by several PU types).

In this manner, source device 12 is an example of an apparatus including a video encoder configured to encode luminance data of a coding unit of video data using a motion vector having one-eighth-pixel precision for the luminance data, calculate, using bilinear interpolation, values of one-sixteenth pixel positions of chrominance data of a reference block identified by the motion vector, and encode chrominance data of the coding unit based on the bilinear interpolated values of the reference block.

Video encoder 20 may also encode the motion vector, e.g., by calculating a motion vector difference value for the motion vector relative to a motion vector predictor, also referred to as a motion predictor. Video encoder 20 may encode the motion vector difference (MVD) value differently, based on the sub-pixel precision for the motion vector. That is, video encoder 20 may be configured with different MVD value encoding schemes, each corresponding to a different possible sub-pixel precision for motion vectors. For example, if video encoder 20 is capable of selecting between one-quarter pixel precision and one-eighth pixel precision for motion vectors, video encoder 20 may be configured with a first MVD coding scheme for encoding MVD values corresponding to one-quarter pixel precision motion vectors, and a second MVD coding scheme for encoding MVD values corresponding to one-eighth pixel precision motion vectors. In this manner, video encoder 20 may use the first MVD coding scheme to encode an MVD value corresponding to a motion vector having one-quarter pixel precision, and may use the second MVD coding scheme to encode an MVD value corresponding to a motion vector having one-eighth pixel precision.

As an example, a generic MVD coding scheme may include a threshold value. When an MVD value is less than the threshold value, video encoder 20 may encode the MVD value using a unary code. On the other hand, when the MVD value is greater than the threshold value, video encoder 20 may encode the MVD value using a golomb code. An MVD value for a motion vector having one-eighth pixel precision is approximately twice as large as an MVD value for a similar motion vector having one-quarter pixel precision. For example, if the vertical component of a motion vector is 10, and the motion predictor is 20 in one-eight pixel precision, the MVD value would be 10. On the other hand, the same motion vector in one-quarter pixel precision would have a vertical component of 5 and a motion predictor of 10, and thus, the MVD value would be 5. The statistics of the motion vector difference will likely be different for one-quarter pixel precision vis-à-vis one-eighth pixel precision. Accordingly, in this example, video encoder 20 may include different threshold values depending on the sub-integer pixel precision of the motion vector being encoded.

To calculate values for sub-integer pixel positions, video encoder 20 may include a variety of interpolation filters. For example, bilinear interpolation may be used to calculate values for sub-integer pixel positions. Video encoder 20 may be configured to perform a motion search with respect to luminance data of a PU to calculate a motion vector using the luminance data of the PU. Video encoder 20 may then reuse the motion vector to encode chrominance data of the PU. Typically, chrominance data has a lower resolution than corresponding luminance data, e.g., one-quarter of the resolution of luminance data. Therefore, the motion vector for chrominance data may have a higher precision than for luminance data. For example, one-quarter pixel precision motion vectors for luminance data may have one-eighth pixel precision for chrominance data. Similarly, one-eighth pixel precision motion vectors for luminance data may have one-sixteenth pixel precision for chrominance data. In some examples, video encoder 20 may provide an indication, e.g., in the bitstream, of whether the MVD value exceeds the threshold for the MVD coding scheme.

In this manner, source device 12 is an example of an apparatus including a video encoder configured to encode a prediction unit of a coding unit of video data using a motion vector having one of a first sub-pixel precision or a second, different sub-pixel precision, determine a context for encoding an indication of whether the motion vector has the first sub-pixel precision or the second sub-pixel precision using context adaptive binary arithmetic coding, wherein the context comprises at least one of a depth of the coding unit, a size of the prediction unit, and a type for the prediction unit, and entropy encode the indication using the determined context in accordance with context adaptive binary arithmetic coding.

HM has been configured to quantize one-eighth pixel precision motion vectors for luminance data to one-quarter pixel precision when encoding chrominance data. Accordingly, HM always uses motion vectors having one-eighth pixel precision for chrominance data. Designers of HM believed that using motion vectors having one-sixteenth pixel precision would be significantly more complex. The techniques of this disclosure, on the other hand, propose using a one-sixteenth pixel precision motion vector to encode chrominance data when the motion vector has one-eighth pixel precision for corresponding luminance data. To encode chrominance data when a motion vector for luminance data has one-eighth pixel precision, this disclosure proposes using bilinear interpolation to interpolate values for one-sixteenth pixel positions. Empirical testing for producing the techniques of this disclosure demonstrated an unexpected result that the complexity of using one-sixteenth pixel precision motion vectors is the same as the complexity of using one-eighth pixel precision motion vectors to calculate values for chrominance data.

In this manner, source device 12 is an example of an apparatus including a video encoder configured to calculate a first motion vector difference value when encoding a first prediction unit of video data, the first motion vector difference value having a first sub-pixel precision, encode the first motion vector difference value using a first motion vector difference encoding scheme, wherein the first motion vector difference encoding scheme is associated with the first sub-pixel precision, calculate a second motion vector difference value when encoding a second prediction unit of the video data, the second motion vector difference value having a second, different sub-pixel precision, and encode the second motion vector difference value using a second motion vector difference encoding scheme, wherein the second motion vector difference encoding scheme is associated with the second sub-pixel precision.

Following intra-predictive or inter-predictive coding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, macroblock type, coding mode, LCU size, or the like.

Video decoder 30 of destination device 14 may be configured to perform techniques similar, and generally symmetric, to any or all of the techniques of video encoder 20 of this disclosure. For example, video decoder 30 may be configured to receive information defining a context in which an indication of a sub-pixel precision for a motion vector of a PU of a CU was encoded. Video encoder 20 may provide, and video decoder 30 may receive, the context information in a quadtree for an LCU including the CU and the PU. The context information may correspond to size information for the CU and/or the PU, e.g., a depth of the CU, a size of the PU, and/or a type for the PU. Video decoder 30 may use the context information to decode the indication of the sub-pixel precision of the motion vector, e.g., to determine whether the motion vector has one-quarter pixel precision or one-eighth pixel precision. For example, video decoder 30 may perform an inverse entropy coding process using the context information to entropy decode the indication of the sub-pixel precision for the motion vector.

In this manner, destination device 14 is an example of an apparatus including a video decoder configured to receive an encoded prediction unit of a coding unit of video data that was encoded using a motion vector having one of a first sub-pixel precision or a second, different sub-pixel precision, receive a context adaptive binary arithmetic coded indication of whether the motion vector has the first sub-pixel precision or the second sub-pixel precision, determine a context for decoding the indication, wherein the context comprises at least one of a depth of the coding unit, a size of the prediction unit, and a type for the prediction unit, and entropy decode the indication using the determined context in accordance with context adaptive binary arithmetic coding.

As noted above, the motion vector may be encoded using an MVD value, calculated as the difference between the motion vector and a motion predictor. Video decoder 30 may be configured with techniques generally parallel to those of video encoder 20 for selecting a motion predictor. For example, both video encoder 20 and video decoder 30 may be configured to select a motion predictor for a current PU as the median of motion vectors for neighboring, previously coded PUs. Accordingly, video decoder 30 may decode the motion vector by adding the MVD value for the motion vector to the motion predictor.

Moreover, in accordance with the techniques of this disclosure, video decoder 30 may be configured with different MVD decoding schemes, based on sub-pixel precisions for motion vectors. Thus, video decoder 30 may select the MVD decoding scheme to apply based on the sub-pixel precision for the motion vector, as determined from the received indication of sub-pixel precision discussed above. For example, video decoder 30 may apply a first MVD coding scheme to a first MVD value when the first MVD value corresponds to an indication of one-eighth pixel precision, and video decoder 30 may apply a second MVD coding scheme to a second MVD value when the second MVD value corresponds to an indication of one-quarter pixel precision. In other examples, other MVD coding schemes may correspond to other sub-pixel precisions for motion vectors.

In this manner, destination device 14 is an example of an apparatus including a video decoder configured to receive a first motion vector difference value for a first prediction unit of video data, the first motion vector difference value having a first sub-pixel precision, decode the first motion vector difference value using a first motion vector difference encoding scheme, wherein the first motion vector difference decoding scheme is associated with the first sub-pixel precision, receive a second motion vector difference value for a second prediction unit of the video data, the second motion vector difference value having a second, different sub-pixel precision, and decode the second motion vector difference value using a second motion vector difference decoding scheme, wherein the second motion vector difference decoding scheme is associated with the second sub-pixel precision.

Furthermore, video decoder 30 may be configured to reuse motion vectors received for luminance data of a CU to decode chrominance data for the CU. Again, if a motion vector for the luminance data has, e.g., one-eighth pixel precision, and chrominance data for the CU is downsampled by one-quarter (one-half resolution both horizontally and vertically), then the motion vector may have one-sixteenth pixel precision for the chrominance data. Video decoder 30 may be configured to interpolate values for one-sixteenth pixel precision positions using bilinear interpolation, rather than quantizing the one-eighth pixel precision motion vector (for luminance data) to one-quarter pixel precision.

In this manner, destination device 14 is an example of an apparatus including a video decoder configured to receive a motion vector having one-eighth-pixel precision for luminance data of a coding unit of video data, calculate, using bilinear interpolation, values of one-sixteenth pixel positions of chrominance data of a reference block identified by the motion vector, and decode chrominance data of the coding unit based on the bilinear interpolated values of the reference block.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
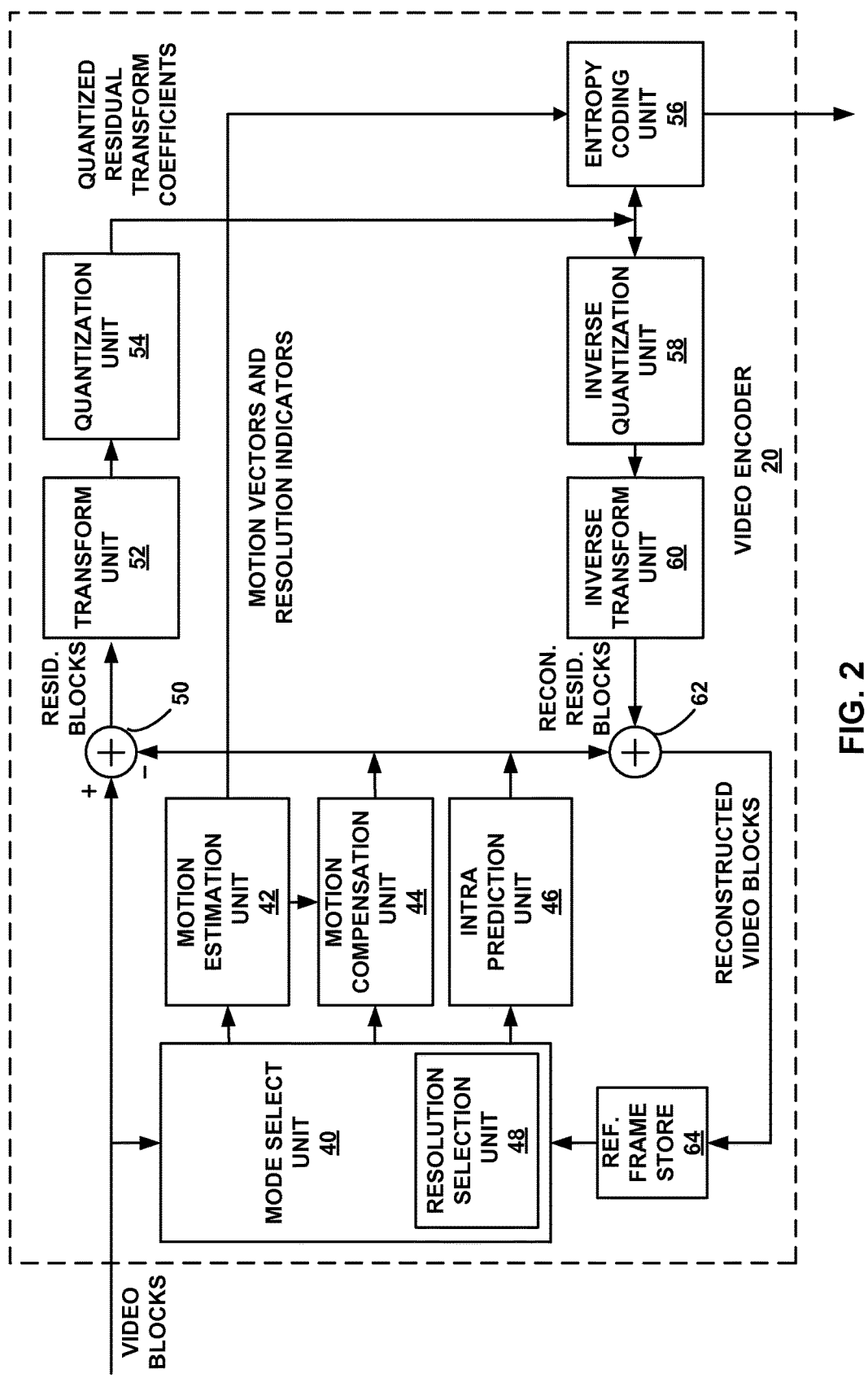
FIG. 2 is a block diagram illustrating an example of a video encoder that may implement techniques for supporting adaptive motion vector resolution.

FIG. 2 is a block diagram illustrating an example of video encoder 20 that may implement techniques for supporting adaptive motion vector resolution. Video encoder 20 may perform intra- and inter-prediction of blocks within video frames, including LCUs, CUs, and PUs, and calculate residual values that may be encoded as TUs. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes. Motion estimation unit 42 and motion compensation unit 44 may perform inter-prediction coding, while intra-prediction unit 46 may perform intra-prediction coding.

As shown in FIG. 2, video encoder 20 receives a current video block within a video frame to be encoded. In the example of FIG. 2, video encoder 20 includes motion compensation unit 44, motion estimation unit 42, intra-prediction unit 46, reference frame store 64, summer 50, transform unit 52, quantization unit 54, and entropy coding unit 56. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks (e.g., LCUs). Motion estimation unit 42 and motion compensation unit 44 perform inter-predictive coding of the received video block relative to one or more blocks in one or more reference frames to provide temporal compression. Intra-prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. When mode select unit 40 selects inter-mode encoding for a block, resolution selection unit 48 may select a resolution for a motion vector for the block. For example, resolution selection unit 48 may select one-eighth-pixel precision or one-quarter-pixel precision for a motion vector for the block.

As an example, resolution selection unit 48 may be configured to compare an error difference between using a one-quarter-pixel precision motion vector to encode a block and using a one-eighth-pixel precision motion vector to encode the block. Motion estimation unit 42 may be configured to encode a block using one or more quarter-pixel precision motion vectors in a first coding pass and one or more eighth-pixel precision motion vectors in a second coding pass. Motion estimation unit 42 may further use a variety of combinations of one or more quarter-pixel precision motion vectors and one or more eighth-pixel precision motion vectors for the block in a third encoding pass. Resolution selection unit 48 may calculate rate-distortion values for each encoding pass of the block and calculate differences between the rate-distortion values.

When the difference exceeds a threshold, resolution selection unit 48 may select the one-eighth-pixel precision motion vector for encoding the block. Resolution selection unit 48 may also evaluate rate-distortion information, analyze a bit budget, and/or analyze other factors to determine whether to use one-eighth-pixel precision or one-quarter-pixel precision for a motion vector when encoding a block during an inter-mode prediction process. After selecting one-eighth-pixel precision or one-quarter-pixel precision for a block to be inter-mode encoded, mode select unit 40 or motion estimation may send a message (e.g., a signal) to motion estimation unit 42 indicative of the selected precision for a motion vector.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in reference frame store 64. Motion compensation unit 44 may also interpolate sub-integer pixels of the reference frame, e.g., an I-frame or a P-frame. The ITU H.264 standard, as an example, describes two lists: list 0, which includes reference frames having a display order earlier than a current frame being encoded, and list 1, which includes reference frames having a display order later than the current frame being encoded. Therefore, data stored in reference frame store 64 may be organized according to these lists.

In accordance with the techniques of this disclosure, motion compensation unit 44 may be configured to interpolate values for one-sixteenth pixel positions of chrominance data of a CU when a motion vector for luminance data of the CU has one-eighth pixel precision. To interpolate values for the one-sixteenth pixel positions of the chrominance data, motion compensation unit 44 may utilize bilinear interpolation. Therefore, summer 50 may calculate a residual for the chrominance data of the CU relative to bilinear interpolated values of one-sixteenth pixel positions of a reference block. In this manner, video encoder 20 may calculate, using bilinear interpolation, values of one-sixteenth pixel positions of chrominance data of a reference block identified by a motion vector and encode chrominance data of a coding unit based on the bilinear interpolated values of the reference block, when luminance data of the coding unit was encoded using a motion vector having one-eighth pixel precision for the luminance data.

Motion estimation unit 42 compares blocks of one or more reference frames from reference frame store 64 to a block to be encoded of a current frame, e.g., a P-frame or a B-frame. When the reference frames in reference frame store 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in reference frame store 64 if no values for sub-integer pixel positions are stored in reference frame store 64. Motion estimation unit 42 sends the calculated motion vector to entropy coding unit 56 and motion compensation unit 44. The reference frame block identified by a motion vector may be referred to as a predictive block.

Motion estimation unit 42, motion compensation unit 44, mode select unit 40, or another unit of video encoder 20, may also signal the use of one-quarter-pixel precision or one-eighth-pixel precision for a motion vector used to encode a block. For example, motion estimation unit 42 may send an indication of a sub-integer pixel precision for the motion vector to entropy coding unit 56. Motion estimation unit 42 may also provide context information relating to size information for a PU corresponding to the motion vector to entropy coding unit 56, where the size information may include any or all of a depth of a CU including the PU, a size of the PU, and/or a type for the PU.

Motion compensation unit 44 may calculate prediction data based on the predictive block. Video encoder 20 forms a residual video block by subtracting the prediction data from motion compensation unit 44 from the original video block being coded. Summer 50 represents the component or components that perform this subtraction operation. Transform unit 52 applies a transform, such as a discrete cosine transform (DCT) or a conceptually similar transform, to the residual block, producing a video block comprising residual transform coefficient values.

Transform unit 52 may perform other transforms, such as those defined by the H.264 standard, which are conceptually similar to DCT. Wavelet transforms, integer transforms, sub-band transforms or other types of transforms could also be used. In any case, transform unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring macroblocks.

In some cases, entropy coding unit 56 or another unit of video encoder 20 may be configured to perform other coding functions, in addition to entropy coding. For example, entropy coding unit 56 may be configured to determine the CBP values for the macroblocks and partitions. Also, in some cases, entropy coding unit 56 may perform run length coding of the coefficients in a macroblock or partition thereof. In particular, entropy coding unit 56 may apply a zig-zag scan or other scan pattern to scan the transform coefficients in a macroblock or partition and encode runs of zeros for further compression. Entropy coding unit 56 also may construct header information with appropriate syntax elements for transmission in the encoded video bitstream.

In accordance with the techniques of this disclosure, entropy coding unit 56 may be configured to encode an indication of a sub-pixel precision for a motion vector, e.g., to indicate whether the motion vector has one-quarter pixel precision or one-eighth pixel precision (or other sub-pixel precisions, in various examples). Entropy coding unit 56 may encode the indication using CABAC. Furthermore, entropy coding unit 56 may use context information for performing CABAC to encode the indication that indicates size information for a PU corresponding to the motion vector, where the size information may include any or all of a depth of a CU including the PU, a size of the PU, and/or a type for the PU.

Motion estimation unit 42 may further calculate a motion vector difference (MVD) value for the motion vector and pass the MVD value, rather than the motion vector itself, to entropy coding unit 56. Entropy coding unit 56 may be configured with a variety of MVD coding schemes, each relating to sub-pixel precisions for motion vectors. Accordingly, entropy coding unit 56 may encode the MVD value for the motion vector using an MVD coding scheme corresponding to the sub-pixel precision for the motion vector corresponding to the MVD value.

As one example, entropy coding unit 56 may be configured with a first MVD coding scheme for one-quarter pixel precision and a second MVD coding scheme for one-eighth pixel precision. The first MVD coding scheme may comprise coding an MVD value using a unary codeword when the MVD value is less than a threshold and a golomb codeword when the MVD value is greater than or equal to the threshold. The threshold for the first encoding scheme may comprise a value of, e.g., ten. The second MVD coding scheme may comprise coding an MVD value using a unary codeword when the MVD value is less than a threshold and a golomb codeword when the MVD value is greater than or equal to the threshold, where the threshold may comprise a value of, e.g., five for the second MVD coding scheme. The unary and golomb codewords in the first and second MVD coding schemes may be different, based on different statistics gathered for MVD values corresponding to one-quarter and one-eighth pixel precision motion vectors. Entropy coding unit 56 may output the coded (e.g., unary or golomb) representation of the MVD value. In some examples, entropy coding unit 56 may provide an indication (such as a one-big flag) of whether the MVD value exceeded its corresponding threshold, and thus implicitly may provide an indication of whether the coded representation comprises a unary or golomb codeword.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame store 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame store 64. The reconstructed video block may be used by motion estimation unit 42 and motion compensation unit 44 as a reference block to inter-code a block in a subsequent video frame.

In this manner, FIG. 2 represents an example of a video encoder configured to encode a prediction unit of a coding unit of video data using a motion vector having one of a first sub-pixel precision or a second, different sub-pixel precision, determine a context for encoding an indication of whether the motion vector has the first sub-pixel precision or the second sub-pixel precision using context adaptive binary arithmetic coding, wherein the context comprises at least one of a depth of the coding unit, a size of the prediction unit, and a type for the prediction unit, and entropy encode the indication using the determined context in accordance with context adaptive binary arithmetic coding.

Likewise, FIG. 2 represents an example of a video encoder configured to encode luminance data of a coding unit of video data using a motion vector having one-eighth-pixel precision for the luminance data, calculate, using bilinear interpolation, values of one-sixteenth pixel positions of chrominance data of a reference block identified by the motion vector, and encode chrominance data of the coding unit based on the bilinear interpolated values of the reference block.

Furthermore, FIG. 2 represents an example of a video encoder configured to calculate a first motion vector difference value when encoding a first prediction unit of video data, the first motion vector difference value having a first sub-pixel precision, encode the first motion vector difference value using a first motion vector difference encoding scheme, wherein the first motion vector difference encoding scheme is associated with the first sub-pixel precision, calculate a second motion vector difference value when encoding a second prediction unit of the video data, the second motion vector difference value having a second, different sub-pixel precision, and encode the second motion vector difference value using a second motion vector difference encoding scheme, wherein the second motion vector difference encoding scheme is associated with the second sub-pixel precision.

Figure 3:
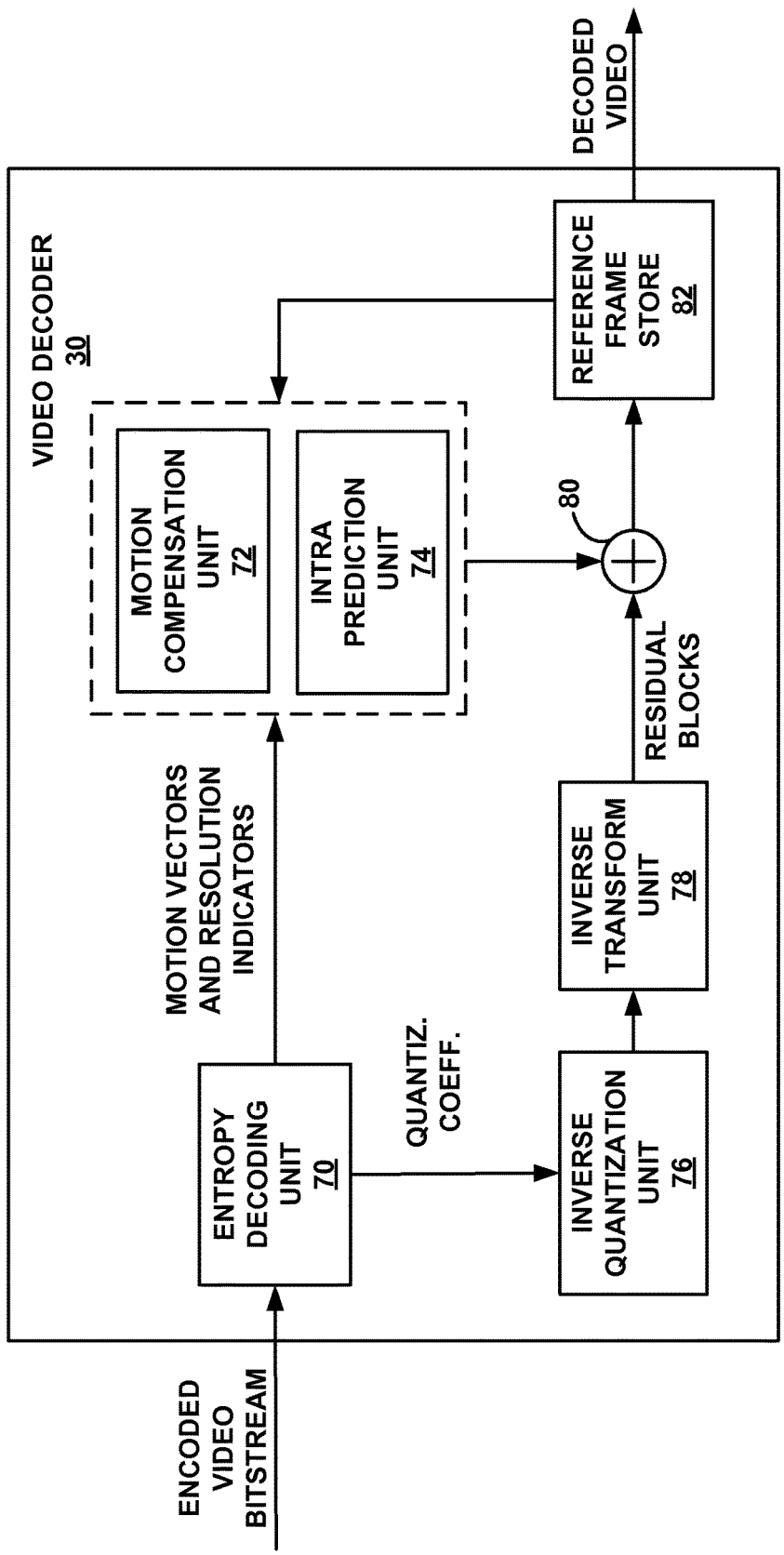
FIG. 3 is a block diagram illustrating an example of a video decoder, which decodes an encoded video sequence.

FIG. 3 is a block diagram illustrating an example of video decoder 30, which decodes an encoded video sequence. In the example of FIG. 3, video decoder 30 includes an entropy decoding unit 70, motion compensation unit 72, intra prediction unit 74, inverse quantization unit 76, inverse transformation unit 78, reference frame store 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70.

Entropy decoding unit 70 may receive an encoded bitstream, e.g., via network, broadcast, or from a physical medium. The encoded bitstream may include entropy coded video data. In accordance with the techniques of this disclosure, the entropy coded video data may include an entropy-coded indication of a sub-integer pixel precision of a motion vector for a PU of a CU. The entropy coded video data may also include a quadtree data structure for an LCU including the CU and the PU. The quadtree data structure may include data describing size information for the PU, e.g., a depth of the CU including the PU, a size of the PU, and/or a type for the PU. Entropy decoding unit 70 may use the size information as context information when entropy decoding the indication of the sub-pixel precision of the motion vector. In this manner, entropy decoding unit 70 may decode the indication of the sub-integer pixel precision of the motion vector and send the indication to motion compensation unit 72.

Entropy decoding unit 70 may also receive an encoded motion vector difference (MVD) value for the PU. Entropy decoding unit 70 may use the determined sub-integer pixel precision for the motion vector to determine an entropy decoding scheme to apply to the MVD value for the PU. In particular, entropy decoding unit 70 may be configured with a variety of different MVD decoding schemes, each associated with a respective sub-pixel precision for a motion vector. Entropy decoding unit 70 may select the MVD decoding scheme associated with the sub-pixel precision indicated by the indication, decoded as discussed above, to decode the MVD value. Entropy decoding unit 70 may send the decoded MVD value to motion compensation unit 72, which may decode the motion vector for the PU, e.g., relative to a motion predictor, which may correspond to the median of the motion vectors of neighboring, previously coded PUs.

Motion compensation unit 72 may use motion vectors received in the bitstream to identify a prediction block in reference frames in reference frame store 82. Intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by video encoder 20 for each macroblock to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks. In accordance with the techniques of this disclosure, motion compensation unit 72 may interpolate values of one-sixteenth pixel positions of chrominance data of a reference block when a motion vector has one-eighth pixel precision for luminance data. For example, motion compensation unit 72 may use bilinear interpolation to interpolate the values of the one-sixteenth pixel positions of the reference block.

Motion compensation unit 72 uses some of the syntax information to determine sizes of LCUs and CUs used to encode frame(s) and/or slice(s) of the encoded video sequence, partition information that describes how each macroblock of a frame of the encoded video sequence is partitioned, modes indicating how each partition is encoded, one or more reference frames (and reference frame lists) for each inter-encoded CU, and other information to decode the encoded video sequence.

Summer 80 sums the residual blocks with the corresponding prediction blocks generated by motion compensation unit 72 or intra-prediction unit to form decoded blocks. If desired, a deblocking filter may also be applied to filter the decoded blocks in order to remove blockiness artifacts. The decoded video blocks are then stored in reference frame store 82, which provides reference blocks for subsequent motion compensation and also produces decoded video for presentation on a display device (such as display device 32 of FIG. 1).

In this manner, FIG. 3 represents an example of a video decoder configured to receive an encoded prediction unit of a coding unit of video data that was encoded using a motion vector having one of a first sub-pixel precision or a second, different sub-pixel precision, receive a context adaptive binary arithmetic coded indication of whether the motion vector has the first sub-pixel precision or the second sub-pixel precision, determine a context for decoding the indication, wherein the context comprises at least one of a depth of the coding unit, a size of the prediction unit, and a type for the prediction unit, and entropy decode the indication using the determined context in accordance with context adaptive binary arithmetic coding.

FIG. 3 also represents an example of a video decoder configured to receive a motion vector having one-eighth-pixel precision for luminance data of a coding unit of video data, calculate, using bilinear interpolation, values of one-sixteenth pixel positions of chrominance data of a reference block identified by the motion vector, and decode chrominance data of the coding unit based on the bilinear interpolated values of the reference block.

FIG. 3 further represents an example of a video decoder configured to receive a first motion vector difference value for a first prediction unit of video data, the first motion vector difference value having a first sub-pixel precision, decode the first motion vector difference value using a first motion vector difference encoding scheme, wherein the first motion vector difference decoding scheme is associated with the first sub-pixel precision, receive a second motion vector difference value for a second prediction unit of the video data, the second motion vector difference value having a second, different sub-pixel precision, and decode the second motion vector difference value using a second motion vector difference decoding scheme, wherein the second motion vector difference decoding scheme is associated with the second sub-pixel precision.

Figure 4:
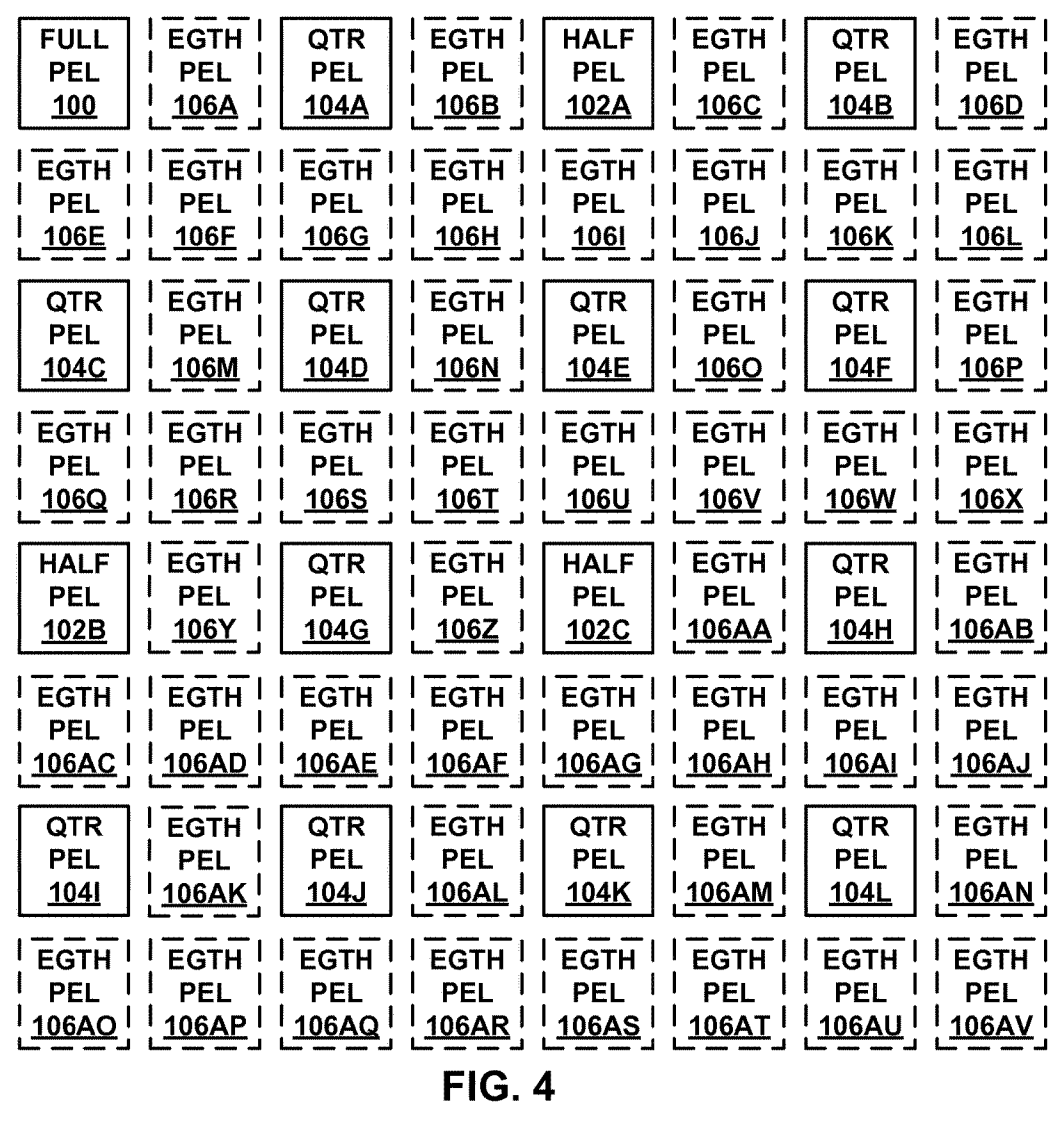

FIG. 4 is a conceptual diagram illustrating fractional pixel positions for a full pixel position. In particular, FIG. 4 illustrates fractional pixel positions for full pixel (pel) 100. Full pixel 100 corresponds to half-pixel positions 102A-102C (half pels 102), quarter pixel positions 104A-104L (quarter pels 104), and one-eighth-pixel positions 106A-106AV (eighth pels 106).

FIG. 4 illustrates eighth pixel positions 106 of a block using dashed outlining to indicate that these positions may be optionally included. That is, if a motion vector has one-eighth-pixel precision, the motion vector may point to any of full pixel position 100, half pixel positions 102, quarter pixel positions 104, or eighth pixel positions 106. However, if the motion vector has one-quarter-pixel precision, the motion vector may point to any of full pixel position 100, half pixel positions 102, or quarter pixel positions 104, but would not point to eighth pixel positions 106. It should further be understood that in other examples, other precisions may be used, e.g., one-sixteenth pixel precision, one-thirty-second pixel precision, or the like.

A value for the pixel at full pixel position 100 may be included in a corresponding reference frame. That is, the value for the pixel at full pixel position 100 generally corresponds to the actual value of a pixel in the reference frame, e.g., that is ultimately rendered and displayed when the reference frame is displayed. Values for half pixel positions 102, quarter pixel positions 104, and eighth pixel positions 106 (collectively referred to as fractional pixel positions) may be interpolated using adaptive interpolation filters or fixed interpolation filters, e.g., filters of various numbers of "taps" (coefficients) such as various Wiener filters, bilinear filters, or other filters. In general, the value of a fractional pixel position may be interpolated from one or more neighboring pixels, which correspond to values of neighboring full pixel positions or previously determined fractional pixel positions.

In accordance with the techniques of this disclosure, a video encoder, such as video encoder 20, may adaptively select a sub-pixel precision for a motion vector, e.g., between one-eighth pixel precision and one-quarter pixel precision. Video encoder 20 may make this selection for each motion vector, each CU, each LCU, each slice, each frame, each GOP, or other coded units of video data. When video encoder 20 selects one-quarter pixel precision for a motion vector, the motion vector may refer to any of full pixel position 100, half pixel positions 102, or quarter pixel positions 104. When video encoder 20 selects one-eighth pixel precision for a motion vector, the motion vector may refer to any of full pixel position 100, half pixel positions 102, quarter pixel positions 104, or eighth pixel positions 106.

Figure 5A:
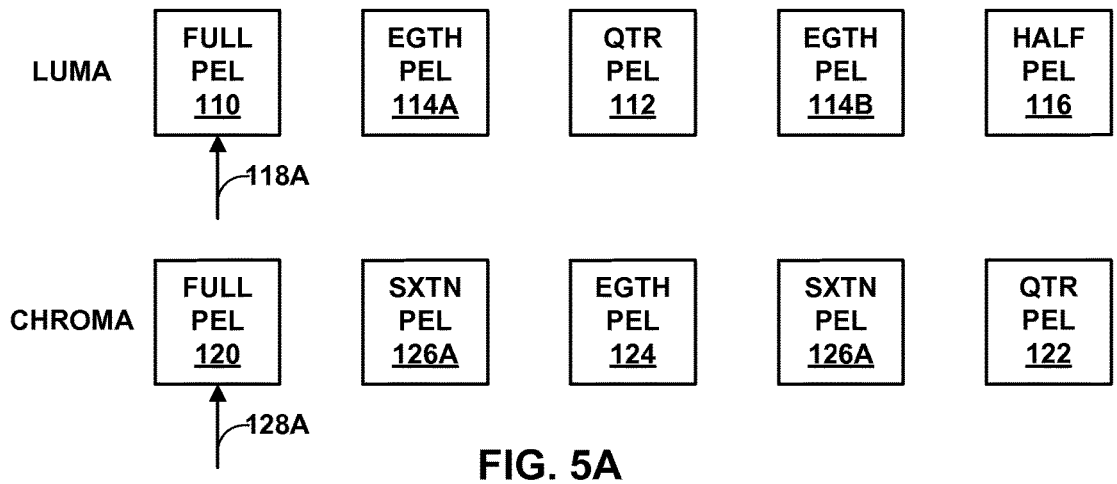
FIGS. 5A-5C are conceptual diagrams illustrating corresponding chrominance and luminance pixel positions.
Figure 5B:
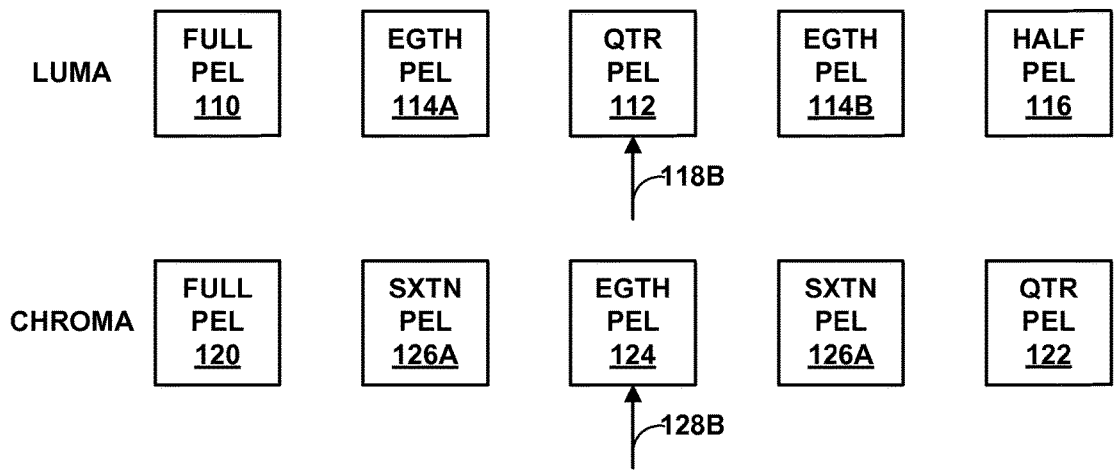
Figure 5C:
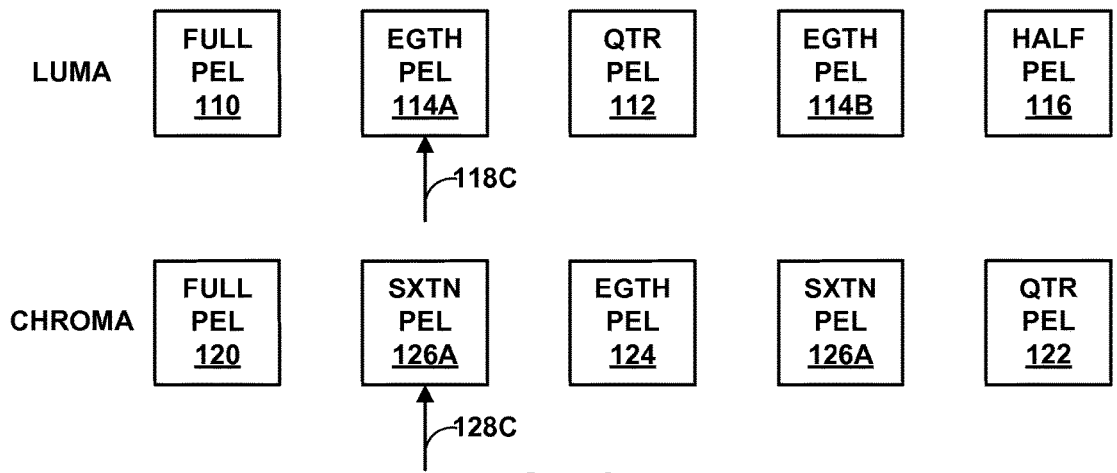

FIGS. 5A-5C are conceptual diagrams illustrating corresponding chrominance and luminance pixel positions. FIGS. 5A-5C also illustrate how motion vectors calculated for luminance data can be reused for chrominance data. As a preliminary matter, FIGS. 5A-5C illustrate a partial row of pixel positions. It should be understood that in practice, a full pixel position may have a rectangular grid of associated fractional pixel positions, such as that illustrated in FIG. 4. The example of FIGS. 5A-5C are intended to illustrate the concepts described in this disclosure, and are not intended as an exhaustive listing of correspondences between fractional chrominance pixel positions and fractional luminance pixel positions.

FIGS. 5A-5C illustrate pixel positions of a luminance block, including full luminance pixel position 110, half luminance pixel position 116, quarter pixel position 112, and eighth luminance pixel positions 114A, 114B. FIGS. 5A-5C also illustrate corresponding pixel positions of a chrominance block, including full chrominance pixel position 120, quarter chrominance pixel position 122, eighth chrominance pixel position 124, and sixteenth chrominance pixel positions 126A, 126B. In this example, full chrominance pixel 120 corresponds to full luminance pixel 110. Further, in this example, the chrominance block is downsampled by a factor of two horizontally and vertically relative to the luminance block. Thus, quarter chrominance pixel 122 corresponds to half luminance pixel 116. Similarly, eighth chrominance pixel 124 corresponds to quarter luminance pixel 112, sixteenth chrominance pixel 126A corresponds to eighth luminance pixel 114A, and sixteenth chrominance pixel 126B corresponds to eighth luminance pixel 114B.

FIG. 5A illustrates an example of a luminance motion vector 118A pointing to full luminance pixel position 110. A video coding unit, such as video encoder 20 or video decoder 30, may reuse luminance motion vector 118A when performing motion compensation for a chrominance block. Accordingly, chrominance motion vector 128A may point to full chrominance pixel 120, due to the correspondence between full chrominance pixel 120 and full luminance pixel 110. The value of the pixel pointed to by chrominance motion vector 128A may be equal to the value of full chrominance pixel 120. Thus, each pixel in a prediction chrominance block may be set equal to a corresponding pixel in the reference frame.

FIG. 5B illustrates an example of a luminance motion vector 118B pointing to quarter luminance pixel position 112. Chrominance motion vector 128B, in turn, points to eighth chrominance pixel position 124. A video coding unit may interpolate a value for eighth chrominance pixel position 124 using an interpolation filter associated with eighth chrominance pixel position 124.

FIG. 5C illustrates an example of a luminance motion vector 118C pointing to eighth luminance pixel position 114A. Chrominance motion vector 128C, in turn, points to sixteenth chrominance pixel position 126A. A video coding unit may interpolate a value for sixteenth chrominance pixel position 126A using bilinear interpolation, in accordance with the techniques of this disclosure. For example, video encoder 20 may interpolate a value for sixteenth pixel position 126A using bilinear interpolation to encode chrominance data of a CU when a motion vector calculated for luminance data (e.g., luminance motion vector 118C) refers to eighth pixel position 114A of luminance data. Likewise, video decoder 30 may interpolate a value for sixteenth pixel position 126A using bilinear interpolation to decode chrominance data of a CU when a motion vector received for luminance data (e.g., luminance motion vector 118C) refers to eighth pixel position 114A of luminance data.

Figure 6:
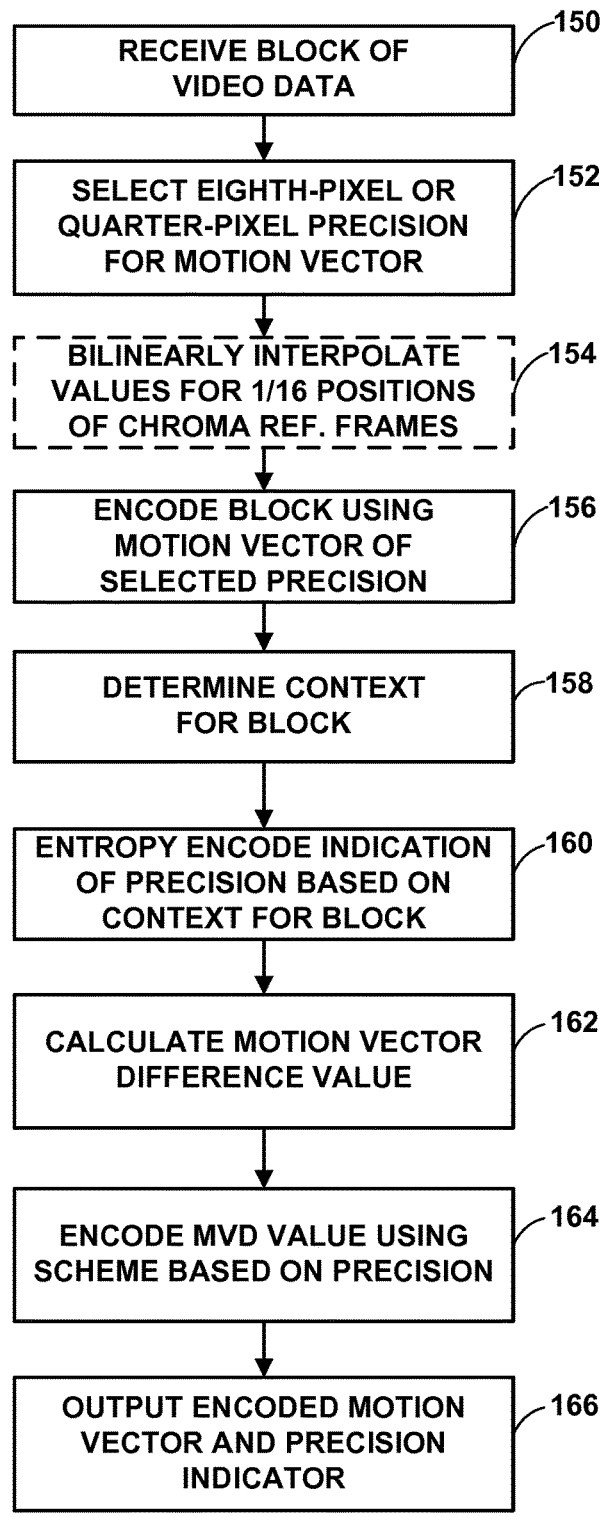
FIG. 6 is a flowchart illustrating an example method for encoding video data in accordance with the techniques of this disclosure.

FIG. 6 is a flowchart illustrating an example method for encoding video data in accordance with the techniques of this disclosure. Although described with respect to video encoder 20 (FIGS. 1 and 2) for purposes of example, it should be understood that the techniques of FIG. 6 may be performed by any video coding unit. Moreover, the steps illustrated in FIG. 6 may be performed in a different order, certain steps may be omitted, and additional steps may be added, without departing from the techniques of this disclosure.

Initially, video encoder 20 may receive a block (e.g., a CU) of video data (150). Resolution selection unit 48 may determine whether to encode a PU of the CU using one-eighth pixel precision or one-quarter pixel precision motion vector (152). For example, video encoder 20 may perform two encoding passes: one using one-eighth pixel precision and another using one-quarter pixel precision, and resolution selection unit 48 may compare rate-distortion values resulting from the two encoding passes to determine whether to use a one-eighth pixel precision or one-quarter pixel precision motion vector to encode the PU.

In some examples, e.g., where resolution selection unit 48 determines that a one-eighth pixel precision motion vector should be used, video encoder 20 may bilinearly interpolate values for one-sixteenth pixel positions of chrominance reference frames stored in reference frame store 64 (154). Video encoder 20 need not always interpolate values for one-sixteenth pixel positions, and therefore, step 154 is illustrated with a dashed outline to indicate that this step is optional.

In any case, video encoder 20 may then encode the block (e.g., the CU) using a motion vector of the selected precision (156). For example, motion estimation unit 42 may perform a motion search for a PU of the CU, comparing luminance data of the PU to luminance data of the reference frames to calculate a motion vector having the selected precision for the luminance data. Motion compensation unit 44 may then retrieve luminance data of the PU using the motion vector, as well as chrominance data of the PU using the same motion vector. Motion compensation unit 44 may again use bilinear interpolation to calculate values for one-sixteenth pixel positions of a reference block. Motion compensation unit 44 may provide the reference block to summer 50 as a predicted value for the PU, causing summer 50 to calculate a residual for the PU, e.g., the difference between the predicted value and the actual value of the PU.

In this manner, the method of FIG. 6 represents an example of a method including encoding luminance data of a coding unit of video data using a motion vector having one-eighth-pixel precision for the luminance data, calculating, using bilinear interpolation, values of one-sixteenth pixel positions of chrominance data of a reference block identified by the motion vector, and encoding chrominance data of the coding unit based on the bilinear interpolated values of the reference block.

Motion estimation unit 42 or resolution selection unit 48 may provide an indication of the selected sub-pixel precision of the motion vector to entropy coding unit 56, as well as size information for the PU. The size information for the PU may include, for example, a depth of the CU including the PU, a size of the PU, and/or a type for the PU. Entropy coding unit 56 may determine a context for the PU based on the size information (158). Entropy coding unit 56 may entropy encode the indication of the sub-integer pixel precision for the motion vector based on the determined context for the PU (160).

In this manner, FIG. 6 represents an example of a method including encoding a prediction unit of a coding unit of video data using a motion vector having one of a first sub-pixel precision or a second, different sub-pixel precision, determining a context for encoding an indication of whether the motion vector has the first sub-pixel precision or the second sub-pixel precision using context adaptive binary arithmetic coding, wherein the context comprises at least one of a depth of the coding unit, a size of the prediction unit, and a type for the prediction unit, and entropy encoding the indication using the determined context in accordance with context adaptive binary arithmetic coding.

Motion estimation unit 42 may also calculate a motion vector difference value for the motion vector (162), e.g., relative to a motion predictor. In some examples, entropy coding unit 56, motion compensation unit 44, or another unit of video encoder 20 may calculate the motion vector difference value. In any case, video encoder 20 may select the motion predictor, e.g., as the median of motion vectors for neighboring, previously encoded PUs. Video encoder 20 may then calculate the difference between the motion vector for the current PU and the motion predictor.

Entropy coding unit 56 may then select a motion vector difference encoding scheme to use to encode the motion vector difference value based on the sub-integer pixel precision for the motion vector of the current PU. Entropy coding unit 56 may then encode the motion vector difference value using the motion vector difference coding scheme based on the sub-pixel precision of the motion vector (164).

The method of FIG. 6 may be performed multiple times, and each performance of the method may correspond to a motion vector of a different sub-integer pixel precision. Therefore, performing the method of FIG. 6 may comprise an example of a method including calculating a first motion vector difference value when encoding a first prediction unit of video data, the first motion vector difference value having a first sub-pixel precision, encoding the first motion vector difference value using a first motion vector difference encoding scheme, wherein the first motion vector difference encoding scheme is associated with the first sub-pixel precision, calculating a second motion vector difference value when encoding a second prediction unit of the video data, the second motion vector difference value having a second, different sub-pixel precision, and encoding the second motion vector difference value using a second motion vector difference encoding scheme, wherein the second motion vector difference encoding scheme is associated with the second sub-pixel precision.

After encoding the motion vector difference value (to form an encoded motion vector) and the indication of the sub-integer pixel precision for the motion vector, entropy coding unit 56 may output the encoded motion vector and the indication of the precision for the motion vector (166). In some examples, e.g., when the various motion vector encoding schemes include different thresholds corresponding to respective sub-integer pixel precisions, entropy coding unit 56 may also output an indication of whether the motion vector difference exceeded the respective threshold, e.g., a one-bit flag.

Figure 7:
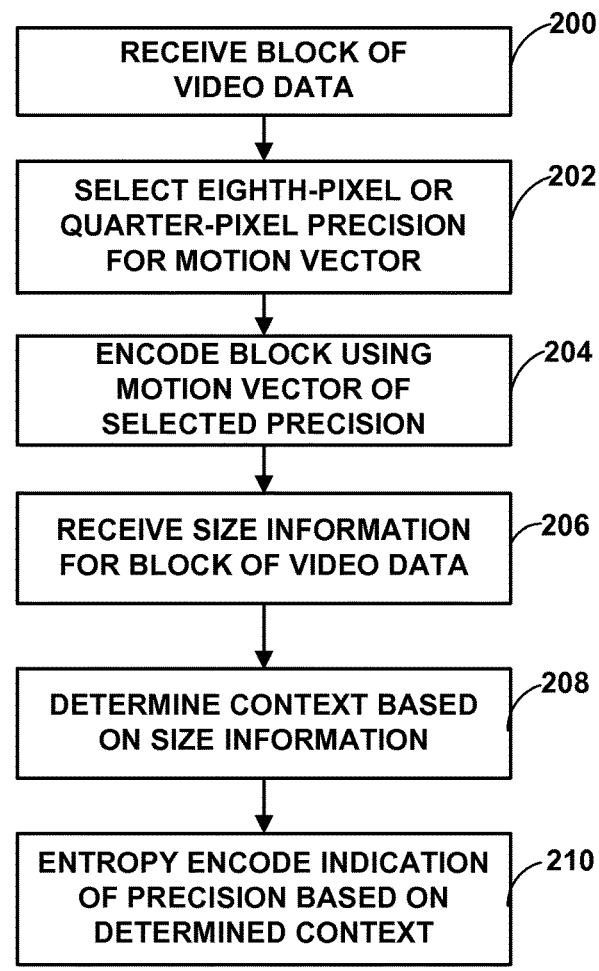
FIG. 7 is a flowchart illustrating an example method for entropy encoding an indication of a sub-integer pixel precision for a motion vector.

FIG. 7 is a flowchart illustrating an example method for entropy encoding an indication of a sub-integer pixel precision for a motion vector. Although described with respect to video encoder 20 (FIGS. 1 and 2) for purposes of example, it should be understood that the techniques of FIG.

7 may be performed by any video coding unit. Moreover, the steps illustrated in FIG. 7 may be performed in a different order, certain steps may be omitted, and additional steps may be added, without departing from the techniques of this disclosure.

Initially, video encoder 20 may receive a block (e.g., a CU) of video data (200). Resolution selection unit 48 may determine whether to encode a PU of the CU using one-eighth pixel precision or one-quarter pixel precision motion vector (202). For example, video encoder 20 may perform two encoding passes: one using one-eighth pixel precision and another using one-quarter pixel precision, and resolution selection unit 48 may compare rate-distortion values resulting from the two encoding passes to determine whether to use a one-eighth pixel precision or one-quarter pixel precision motion vector to encode the PU.

Video encoder 20 may then encode the CU using a motion vector of the selected precision (204). For example, motion estimation unit 42 may perform a motion search for a PU of the CU, comparing luminance data of the PU to luminance data of the reference frames to calculate a motion vector having the selected precision for the luminance data. Motion compensation unit 44 may then retrieve luminance data of the PU using the motion vector, as well as chrominance data of the PU using the same motion vector.

Entropy coding unit 56 may receive an indication of the selected precision for the motion vector, as well as size information for the PU of the CU (206). The size information may include any or all of a depth of the CU, a size of the PU, and/or a type for the PU. Entropy coding unit 56 may determine a context for encoding the indication of the selected precision for the motion vector based on the size information (208).

In some examples, entropy coding unit 56 may collect statistics for each pairing of context and precision of motion vectors in the context. In this manner, entropy coding unit 56 may determine the likelihood of a particular sub-pixel precision for a motion vector in a particular context. Based on these statistics, entropy coding unit 56 may entropy encode the indication of the precision for the motion vector based on the context of the motion vector (210). For example, entropy coding unit 56 may perform context-adaptive binary arithmetic coding to encode the indication using a fractional bit.

In this manner, FIG. 7 represents an example of a method including encoding a prediction unit of a coding unit of video data using a motion vector having one of a first sub-pixel precision or a second, different sub-pixel precision, determining a context for encoding an indication of whether the motion vector has the first sub-pixel precision or the second sub-pixel precision using context adaptive binary arithmetic coding, wherein the context comprises at least one of a depth of the coding unit, a size of the prediction unit, and a type for the prediction unit, and entropy encoding the indication using the determined context in accordance with context adaptive binary arithmetic coding.

Figure 8:
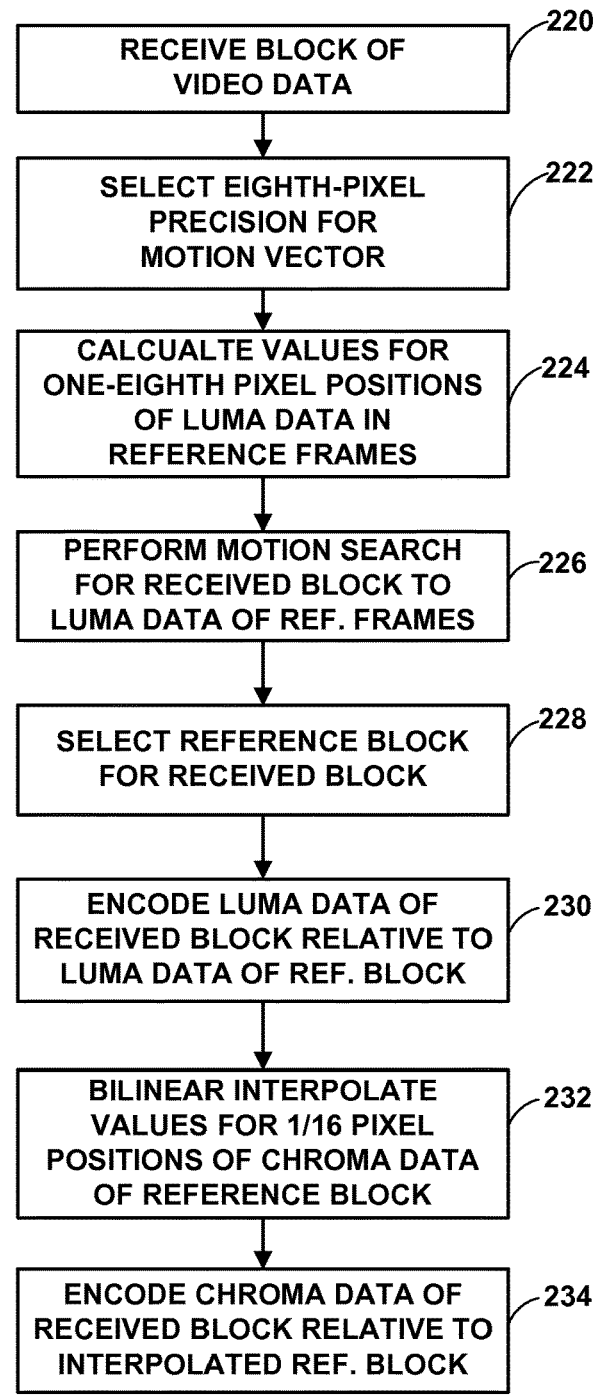
FIG. 8 is a flowchart illustrating an example method for calculating values for one-sixteenth pixel positions of chrominance data when a motion vector has one-eighth pixel precision for corresponding luminance data.

FIG. 8 is a flowchart illustrating an example method for calculating values for one-sixteenth pixel positions of chrominance data when a motion vector has one-eighth pixel precision for corresponding luminance data. Although described with respect to video encoder 20 (FIGS. 1 and 2) for purposes of example, it should be understood that the techniques of FIG. 8 may be performed by any video coding unit. Moreover, the steps illustrated in FIG. 8 may be performed in a different order, certain steps may be omitted, and additional steps may be added, without departing from the techniques of this disclosure.

Initially, video encoder 20 may receive a block (e.g., a CU) of video data (220). In the example of FIG. 8, resolution selection unit 48 may determine to encode a PU of the CU using one-eighth pixel precision for a motion vector of the PU (222). Based on this determination, motion compensation unit 44 may calculate values for one-eighth pixel positions of luminance data in reference frames stored by reference frame store 64 (224).

Motion estimation unit 42 may then perform a motion search for the PU relative to luminance data of the reference frames (226). For example, motion estimation unit 42 may calculate an error between luminance data of the PU and luminance data of the reference frames, analyzing one-eighth pixel positions as well as full pixel positions of the reference frames. Motion estimation unit 42 may then select a reference block for the PU (228), e.g., the reference block yielding the lowest error.

Video encoder 20 may then encode luminance data of the PU relative to the luminance data of the reference block (230). For example, summer 50 may calculate pixel-by-pixel differences between the luminance data of the reference block and the PU being encoded to form a residual block. Video encoder 20 may then encode the residual block to form a transform unit (TU), e.g., by transforming the residual block, quantizing the transformed block, and scanning and encoding coefficients of the quantized, transformed block.

Motion compensation unit 44 may also interpolate values for chrominance data of the reference block. In accordance with the techniques of this disclosure, as the motion vector produced by motion estimation unit 42 had one-eighth pixel precision, motion compensation unit 44 may use bilinear interpolation to interpolate values for one-sixteenth pixel positions of the chrominance data of the reference block (232). Video encoder 20 may then encode the chrominance data of the PU relative to the interpolated reference block (234). For example, summer 50 may calculate a residual block as the pixel-by-pixel difference between the reference block and the chrominance portion of the PU. Again, this residual block may be transformed, quantized, scanned, and entropy encoded, in a manner similar to the luminance block.

In this manner, FIG. 8 represents an example of a method including encoding luminance data of a coding unit of video data using a motion vector having one-eighth-pixel precision for the luminance data, calculating, using bilinear interpolation, values of one-sixteenth pixel positions of chrominance data of a reference block identified by the motion vector, and encoding chrominance data of the coding unit based on the bilinear interpolated values of the reference block.

Figure 9:
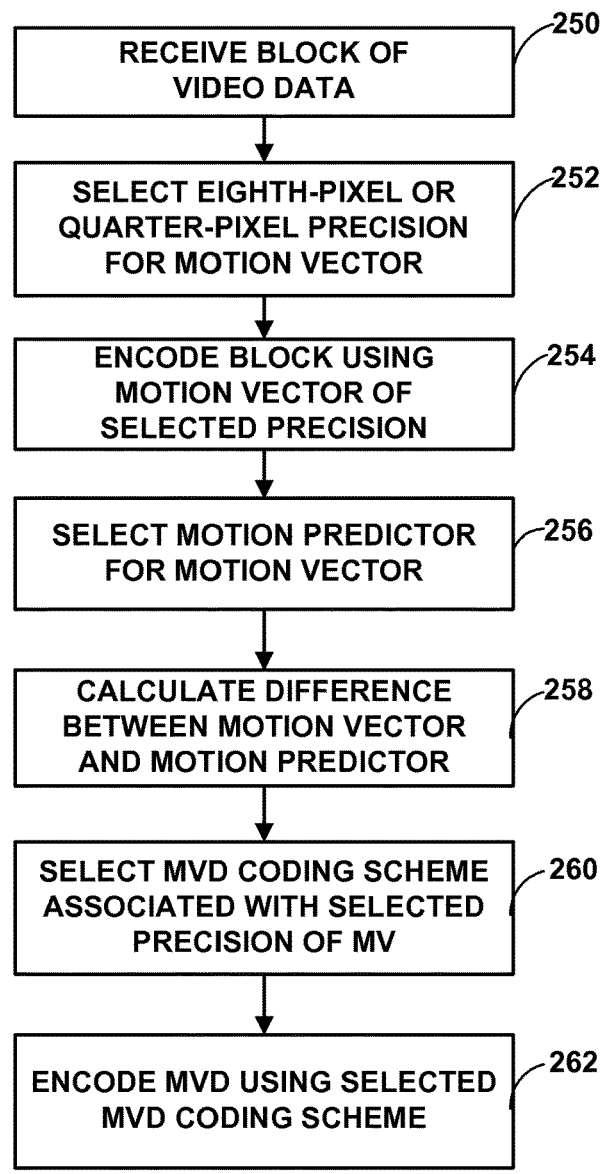
FIG. 9 is a flowchart illustrating an example method for entropy encoding a motion vector difference value for a motion vector using an entropy coding scheme that is based on the sub-pixel precision of the motion vector.

FIG. 9 is a flowchart illustrating an example method for entropy encoding a motion vector difference value for a motion vector using an entropy coding scheme that is based on the sub-pixel precision of the motion vector. Although described with respect to video encoder 20 (FIGS. 1 and 2) for purposes of example, it should be understood that the techniques of FIG. 9 may be performed by any video coding unit. Moreover, the steps illustrated in FIG. 9 may be performed in a different order, certain steps may be omitted, and additional steps may be added, without departing from the techniques of this disclosure.

Initially, video encoder 20 may receive a block (e.g., a CU) of video data (250). Resolution selection unit 48 may determine whether to encode a PU of the CU using one-eighth pixel precision or one-quarter pixel precision motion vector (252). For example, video encoder 20 may perform two encoding passes: one using one-eighth pixel precision and another using one-quarter pixel precision, and resolution selection unit 48 may compare rate-distortion values resulting from the two encoding passes to determine whether to use a one-eighth pixel precision or one-quarter pixel precision motion vector to encode the PU.

Video encoder 20 may then encode the CU using a motion vector of the selected precision (254). For example, motion estimation unit 42 may perform a motion search for a PU of the CU, comparing luminance data of the PU to luminance data of the reference frames to calculate a motion vector having the selected precision for the luminance data. Motion compensation unit 44 may then retrieve luminance data of the PU using the motion vector, as well as chrominance data of the PU using the same motion vector.

Entropy coding unit 56 may then encode the motion vector itself. For example, entropy coding unit 56 may select a motion predictor for the motion vector (256), e.g., as the median of the motion vectors for neighboring, previously encoded PUs. Entropy coding unit 56 may then calculate a motion vector difference (MVD) between the motion vector for the received PU and the motion predictor (258).

Entropy coding unit 56 may then select an MVD coding scheme associated with the selected precision of the motion vector for the current PU (260). Entropy coding unit 56 may then encode the MVD using the selected MVD coding scheme (262).

As an example, entropy coding unit 56 may include a first MVD coding scheme for encoding MVD values corresponding to one-quarter pixel precision motion vectors, and a second MVD coding scheme for encoding MVD values corresponding to one-eighth pixel precision motion vectors. If entropy coding unit 56 receives an indication that motion vector has one-quarter pixel precision, entropy coding unit 56 may encode the MVD value for the motion vector using the first MVD encoding scheme. On the other hand, if entropy coding unit 56 receives an indication that motion vector has one-eighth pixel precision, entropy coding unit 56 may encode the MVD value for the motion vector using the second MVD encoding scheme.

The first MVD encoding scheme may comprise encoding the MVD value using a unary codeword when the MVD value is below a threshold, otherwise encoding the MVD value using a golomb codeword. The threshold for the first MVD coding scheme may correspond to one-quarter pixel precision for motion vectors. Likewise, the unary and golomb codewords may correspond to one-quarter pixel precision for motion vectors. Accordingly, when entropy coding unit 56 receives a first motion vector having one-quarter pixel precision, entropy coding unit 56 may determine whether the MVD value for the first motion vector is greater than or equal to the threshold for the first MVD coding scheme, and encode the MVD value using either a unary codeword or a golomb codeword accordingly. Entropy coding unit 56 may also provide an indication of whether the MVD value exceeded the threshold.

The second MVD encoding scheme may comprise encoding the MVD value using a unary codeword when the MVD value is below a threshold, otherwise encoding the MVD value using a golomb codeword. The threshold for the second MVD coding scheme may correspond to one-eighth pixel precision for motion vectors. Likewise, the unary and golomb codewords may correspond to one-eighth pixel precision for motion vectors. Accordingly, when entropy coding unit 56 receives a second motion vector having one-eighth pixel precision, entropy coding unit 56 may determine whether the MVD value for the second motion vector is greater than or equal to the threshold for the second MVD coding scheme, and encode the MVD value using either a unary codeword or a golomb codeword accordingly. Entropy coding unit 56 may also provide an indication of whether the MVD value exceeded the threshold.

In this manner, FIG. 9 represents an example of a method that, when performed two or more times, may include calculating a first motion vector difference value when encoding a first prediction unit of video data, the first motion vector difference value having a first sub-pixel precision, encoding the first motion vector difference value using a first motion vector difference encoding scheme, wherein the first motion vector difference encoding scheme is associated with the first sub-pixel precision, calculating a second motion vector difference value when encoding a second prediction unit of the video data, the second motion vector difference value having a second, different sub-pixel precision, and encoding the second motion vector difference value using a second motion vector difference encoding scheme, wherein the second motion vector difference encoding scheme is associated with the second sub-pixel precision.

Figure 10:
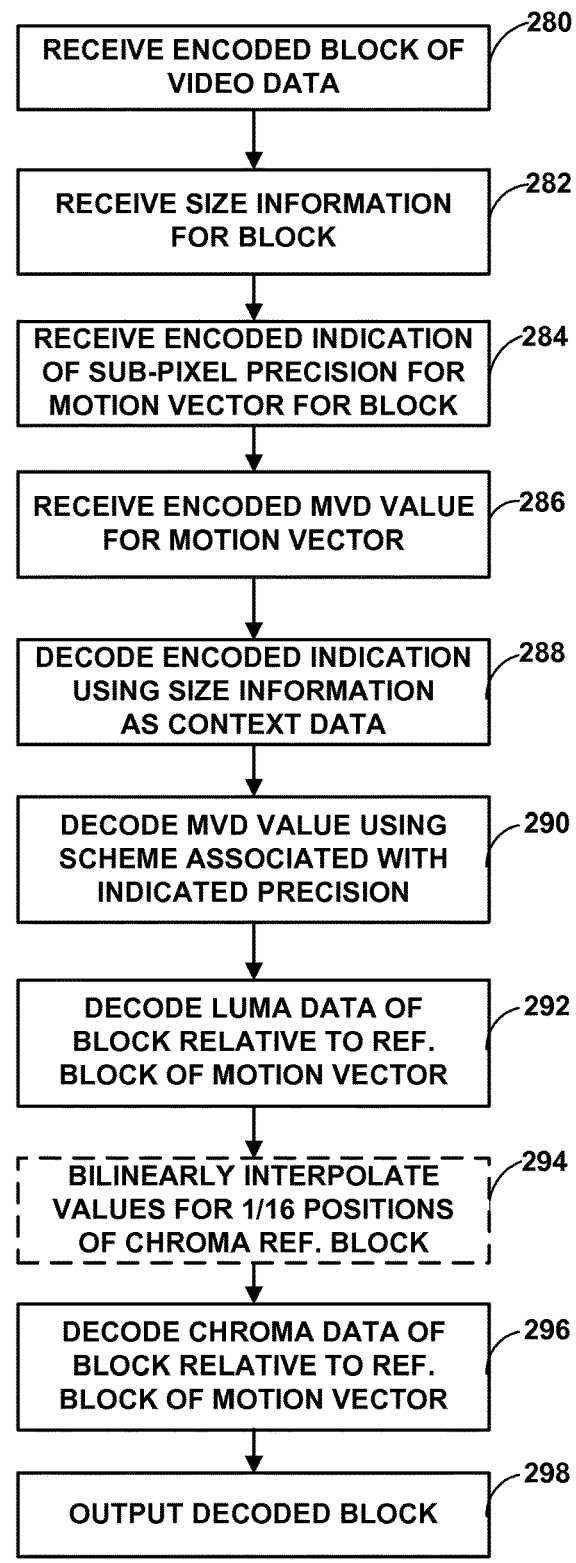
FIG. 10 is a flowchart illustrating an example method for decoding video data in accordance with the techniques of this disclosure.

FIG. 10 is a flowchart illustrating an example method for decoding video data in accordance with the techniques of this disclosure. Although described with respect to video decoder 30 (FIGS. 1 and 3) for purposes of example, it should be understood that the techniques of FIG. 10 may be performed by any video coding unit. Moreover, the steps illustrated in FIG. 10 may be performed in a different order, certain steps may be omitted, and additional steps may be added, without departing from the techniques of this disclosure.

Initially, video decoder 30 may receive an encoded block (e.g., a PU of a CU) of video data (280). The CU may correspond to an LCU, which may be associated with a quadtree data structure. The quadtree data structure may describe characteristics of the CU, such as size information for the CU. The size information may include, for example, a depth of the CU, a size of the PU, and/or a type for the PU. In this manner, video decoder 30 may receive size information for the PU of the CU (282).

For purposes of example, it is assumed that the PU corresponds to an inter-predicted value for the CU. Accordingly, the PU may be associated with a motion vector having a particular sub-integer pixel precision. Thus, video decoder 30 may additionally receive an encoded indication of the sub-pixel precision for the motion vector of the PU (284). The motion vector itself may be encoded, e.g., as a motion vector difference (MVD) value, and therefore, video decoder 30 may further receive an encoded MVD value for the motion vector (286).

Video decoder 30 may decode the encoded indication of the sub-integer pixel precision for the motion vector in accordance with, e.g., CABAC, and using the size information for the PU as context data (288). Video decoder 30 may also decode the MVD value using an MVD decoding scheme associated with the indicated sub-pixel precision of the motion vector (290). Video decoder 30 may then select a motion predictor for the motion vector using techniques similar to those applied by an encoder and add the motion vector difference value to the motion predictor to reproduce the motion predictor.

Video decoder 30 may use the decoded motion vector to decode luminance data of the received CU relative to a reference block referred to by the motion vector (292). Video decoder 30 may interpolate values for sub-integer pixel positions of the reference block based on the sub-integer pixel precision of the motion vector. Video decoder 30 may use the reference block as a predicted value for the luminance data. Video decoder 30 may further decode a TU of the CU, e.g., by inverse scanning, inverse quantizing, and inverse transforming, the TU, to reproduce a residual block for the CU. Video decoder 30 may combine the residual block and the predicted value to decode the portion of the CU corresponding to the PU.

When the motion vector has one-eighth pixel precision, video decoder 30 may bilinearly interpolate values for one-sixteenth pixel positions of chrominance data of the reference block (294). In this manner, video decoder 30 may produce a predicted value for the chrominance portion of the CU. Similar to the luminance data, video decoder 30 may decode the chrominance data of the CU relative to the reference block referred to by the motion vector, for which values of one-sixteenth pixel positions may have been calculated (296). Video decoder 30 may then output the decoded CU, including decoded chrominance data and luminance data (298).

In this manner, FIG. 10 represents an example of a method including receiving an encoded prediction unit of a coding unit of video data that was encoded using a motion vector having one of a first sub-pixel precision or a second, different sub-pixel precision, receiving a context adaptive binary arithmetic coded indication of whether the motion vector has the first sub-pixel precision or the second sub-pixel precision, determining a context for decoding the indication, wherein the context comprises at least one of a depth of the coding unit, a size of the prediction unit, and a type for the prediction unit, and entropy decoding the indication using the determined context in accordance with context adaptive binary arithmetic coding.

FIG. 10 also represents an example of a method including receiving a motion vector having one-eighth-pixel precision for luminance data of a coding unit of video data, calculating, using bilinear interpolation, values of one-sixteenth pixel positions of chrominance data of a reference block identified by the motion vector, and decoding chrominance data of the coding unit based on the bilinear interpolated values of the reference block.

FIG. 10 further represents an example of a method including receiving a first motion vector difference value for a first prediction unit of video data, the first motion vector difference value having a first sub-pixel precision, decoding the first motion vector difference value using a first motion vector difference encoding scheme, wherein the first motion vector difference decoding scheme is associated with the first sub-pixel precision, receiving a second motion vector difference value for a second prediction unit of the video data, the second motion vector difference value having a second, different sub-pixel precision, and decoding the second motion vector difference value using a second motion vector difference decoding scheme, wherein the second motion vector difference decoding scheme is associated with the second sub-pixel precision.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of encoding video data, the method comprising:
　　encoding a prediction unit of a coding unit of video data using a motion vector having one of a first sub-pixel precision or a second, different sub-pixel precision;

determining a context for encoding an indication of whether the motion vector has the first sub-pixel precision or the second sub-pixel precision using context adaptive binary arithmetic coding, wherein determining the context comprises determining the context from at least one of a depth of the coding unit or a size of the prediction unit; and entropy encoding the indication using the determined context in accordance with context adaptive binary arithmetic coding.

2. The method of claim 1, wherein the first sub-pixel precision comprises one-quarter pixel precision, and wherein the second sub-pixel precision comprises one-eighth pixel precision.

3. The method of claim 1, wherein the coding unit has a size of 2N×2N pixels, and wherein the type for the prediction unit corresponds to the prediction unit having a size of one of 2N×2N pixels, 2N×N pixels, N×2N pixels, and N×N pixels, wherein N is an integer value greater than zero.

4. The method of claim 1, wherein encoding the prediction unit comprises calculating the motion vector for luminance data of the coding unit, the luminance data corresponding to the prediction unit, and wherein the motion vector has one-eighth pixel precision for the luminance data, the method further comprising:

calculating, using bilinear interpolation, values of one-sixteenth pixel positions of chrominance data of a reference block identified by the motion vector; and encoding chrominance data of the coding unit based on the bilinear interpolated values of the reference block.

5. The method of claim 1, wherein the prediction unit comprises a first prediction unit, the method further comprising:

calculating a first motion vector difference value when encoding the first prediction unit, the first motion vector difference value having the first sub-pixel precision;

encoding the first motion vector difference value using a first motion vector difference encoding scheme, wherein the first motion vector difference encoding scheme is associated with the first sub-pixel precision;

calculating a second motion vector difference value when encoding a second prediction unit of the video data, the second motion vector difference value having the second sub-pixel precision; and encoding the second motion vector difference value using a second motion vector difference encoding scheme, wherein the second motion vector difference encoding scheme is associated with the second sub-pixel precision.

6. The method of claim 5, wherein encoding the first motion vector difference value using the first motion vector difference encoding scheme comprises:

comparing the first motion vector difference value to a first threshold value defined by the first encoding scheme;

encoding the first motion vector difference value using a first unary codeword when the first motion vector difference value is less than the first threshold; and encoding the first motion vector difference value using a first golomb codeword when the first motion vector difference value is greater than or equal to the first threshold, and wherein encoding the second motion vector difference value using the second motion vector difference encoding scheme comprises:

comparing the second motion vector difference value to a second threshold value defined by the second encoding scheme;

encoding the second motion vector difference value using a second unary codeword when the second motion vector difference value is less than the second threshold; and encoding the second motion vector difference value using u second golomb codeword when the second motion vector difference value is greater than or equal to the second threshold.

7. The method of claim 5, wherein the first motion vector difference encoding scheme is associated with one-quarter pixel precision, and wherein the second motion vector difference encoding scheme is associated with one-eighth pixel precision.

8. The method of claim 5, wherein encoding the first motion vector difference value using the first motion vector difference encoding scheme comprises selecting a first context model to use to entropy encode the first motion vector difference value, wherein the first context model is associated with the first sub-pixel precision, and wherein encoding the second motion vector difference value using the second motion vector difference encoding scheme comprises selecting a second context model to use to entropy encode the second motion vector difference value, wherein the second context model is associated with the second sub-pixel precision.

9. An apparatus for encoding video data, the apparatus comprising:

a memory configured to store video data; and a video encoder configured to:

encode a prediction unit of a coding unit of the video data using a motion vector having one of a first sub-pixel precision or a second, different sub-pixel precision, determine a context for encoding an indication of whether the motion vector has the first sub-pixel precision or the second sub-pixel precision using context adaptive binary arithmetic coding, wherein the video encoder is configured to determine the context from at least one of a depth of the coding unit or a size of the prediction unit, and entropy encode the indication using the determined context in accordance with context adaptive binary arithmetic coding.

10. The apparatus of claim 9, wherein the video encoder is configured to calculate the motion vector for luminance data of the coding unit, the luminance data corresponding to the prediction unit, and wherein the motion vector has one-eighth pixel precision for the luminance data, and wherein the video encoder is configured to calculate, using bilinear interpolation, values of one-sixteenth pixel positions of chrominance data of a reference block identified by the motion vector, and encode chrominance data of the coding unit based on the bilinear interpolated values of the reference block.

11. The apparatus of claim 9, wherein the prediction unit comprises a first prediction unit, and wherein the video encoder is configured to calculate a first motion vector difference value when encoding the first prediction unit, the first motion vector difference value having the first sub-pixel precision, encode the first motion vector difference value using a first motion vector difference encoding scheme, wherein the first motion vector difference encoding scheme is associated with the first sub-pixel precision, calculate a second motion vector difference value when encoding a second prediction unit of the video data, the second motion vector difference value having the second sub-pixel precision, and encode the second motion vector difference value using a second motion vector difference encoding scheme, wherein the second motion vector difference encoding scheme is associated with the second sub-pixel precision.

12. The apparatus of claim 11, wherein to encode the first motion vector difference value using the first motion vector difference encoding scheme, the video encoder is configured to compare the first motion vector difference value to a first threshold value defined by the first encoding scheme, encode the first motion vector difference value using a first unary codeword when the first motion vector difference value is less than the first threshold, and encode the first motion vector difference value using a first golomb codeword when the first motion vector difference value is greater than or equal to the first threshold, and wherein to encode the second motion vector difference value using the second motion vector difference encoding scheme, the video encoder is configured to compare the second motion vector difference value to a second threshold value defined by the second encoding scheme, encode the second motion vector difference value using a second unary codeword when the second motion vector difference value is less than the second threshold, and encode the second motion vector difference value using a second golomb codeword when the second motion vector difference value is greater than or equal to the second threshold.

13. The apparatus of claim 11, wherein the first motion vector difference encoding scheme is associated with one-quarter pixel precision, and wherein the second motion vector difference encoding scheme is associated with one-eighth pixel precision.

14. The apparatus of claim 11, wherein to encode the first motion vector difference value using the first motion vector difference encoding scheme, the video encoder is configured to select a first context model to use to entropy encode the first motion vector difference value, wherein the first context model is associated with the first sub-pixel precision, and wherein to encode the second motion vector difference value using the second motion vector difference encoding scheme, the video encoder is configured to select a second context model to use to entropy encode the second motion vector difference value, wherein the second context model is associated with the second sub-pixel precision.

15. The apparatus of claim 9, wherein the apparatus comprises at least one of:
an integrated circuit;
a microprocessor; or
a wireless communication device that includes the video encoder.

16. An apparatus for encoding video data, the apparatus comprising:
means for encoding a prediction unit of a coding unit of video data using a motion vector having one of a first sub-pixel precision or a second, different sub-pixel precision;
means for determining a context for encoding an indication of whether the motion vector has the first sub-pixel precision or the second sub-pixel precision using context adaptive binary arithmetic coding, wherein the means for determining the context comprises means for determining the context from at least one of a depth of the coding unit or a size of the prediction unit; and
means for entropy encoding the indication using the determined context in accordance with context adaptive binary arithmetic coding.

17. The apparatus of claim 16, wherein the means for encoding the prediction unit comprises means for calculating the motion vector for luminance data of the coding unit, the luminance data corresponding to the prediction unit, and wherein the motion vector has one-eighth pixel precision for the luminance data, the apparatus further comprising:
means for calculating, using bilinear interpolation, values of one-sixteenth pixel positions of chrominance data of a reference block identified by the motion vector; and
means for encoding chrominance data of the coding unit based on the bilinear interpolated values of the reference block.

18. The apparatus of claim 16, wherein the prediction unit comprises a first prediction unit, the apparatus further comprising:
means for calculating a first motion vector difference value when encoding the first prediction unit, the first motion vector difference value having the first sub-pixel precision;
means for encoding the first motion vector difference value using a first motion vector difference encoding scheme, wherein the first motion vector difference encoding scheme is associated with the first sub-pixel precision;
means for calculating a second motion vector difference value when encoding a second prediction unit of the video data, the second motion vector difference value having the second sub-pixel precision; and
means for encoding the second motion vector difference value using a second motion vector difference encoding scheme, wherein the second motion vector difference encoding scheme is associated with the second sub-pixel precision.

19. The apparatus of claim 18,
wherein the means for encoding the first motion vector difference value using the first motion vector difference encoding scheme comprises:
means for comparing the first motion vector difference value to a first threshold value defined by the first encoding scheme;
means for encoding the first motion vector difference value using a first unary- codeword when the first motion vector difference value is less than the first threshold; and
means for encoding the first motion vector difference value using a first golomb codeword when the first motion vector difference value is greater than or equal to the first threshold, and
wherein the means for encoding the second motion vector difference value using the second motion vector difference encoding scheme comprises:
means for comparing the second motion vector difference value to a second threshold value defined by the second encoding scheme;
means for encoding the second motion vector difference value using a second unary codeword when the second motion vector difference value is less than the second threshold; and
means for encoding the second motion vector difference value using a second golomb codeword when the second motion vector difference value is greater than or equal to the second threshold.

20. The apparatus of claim 18,
wherein the means for encoding the first motion vector difference value using the first motion vector difference encoding scheme comprises means for selecting a first context model to use to entropy encode the first motion vector difference value, wherein the first context model is associated with the first sub-pixel precision, and
wherein the means for encoding the second motion vector difference value using the second motion vector difference encoding scheme comprises means for selecting a second context model to use to entropy encode the second motion vector difference value, wherein the second context model is associated with the second sub-pixel precision.

21. A non-transitory computer-readable storage medium having stored thereon instructions that, when executed, cause a processor of a device for encoding video data to:
  encode a prediction unit of a coding unit of video data using a motion vector having one of a first sub-pixel precision or a second, different sub-pixel precision;
  determine a context for encoding an indication of whether the motion vector has the first sub-pixel precision or the second sub-pixel precision using context adaptive binary arithmetic coding, wherein the instructions that cause the processor to determine the context comprise instructions that cause the processor to determine the context from at least one of a depth of the coding unit or a size of the prediction unit; and
  entropy encode the indication using the determined context in accordance with context adaptive binary arithmetic coding.

22. The non-transitory computer-readable storage medium of claim 21, wherein the instructions that cause the processor to encode the prediction unit comprise instructions that cause the processor to calculate the motion vector for luminance data of the coding unit, the luminance data corresponding to the prediction unit, and wherein the motion vector has one-eighth pixel precision for the luminance data, further comprising instructions that cause the processor to:
  calculate, using bilinear interpolation, values of one-sixteenth pixel positions of chrominance data of a reference block identified by the motion vector; and
  encode chrominance data of the coding unit based on the bilinear interpolated values of the reference block.

23. The non-transitory computer-readable storage medium of claim 21, wherein the prediction unit comprises a first prediction unit, further comprising instructions that cause the processor to:
  calculate a first motion vector difference value when encoding the first prediction unit, the first motion vector difference value having the first sub-pixel precision;
  encode the first motion vector difference value using a first motion vector difference encoding scheme, wherein the first motion vector difference encoding scheme is associated with the first sub-pixel precision;
  calculate a second motion vector difference value when encoding a second prediction unit of the video data, the second motion vector difference value having the second sub-pixel precision; and
  encode the second motion vector difference value using a second motion vector difference encoding scheme, wherein the second motion vector difference encoding scheme is associated with the second sub-pixel precision.

24. The non-transitory computer-readable storage medium of claim 23,
  wherein the instructions that cause the processor to encode the first motion vector difference value using the first motion vector difference encoding scheme comprises instructions that cause the processor to:
    compare the first motion vector difference value to a first threshold value defined by the first encoding scheme;
    encode the first motion vector difference value using a first unary codeword when the first motion vector difference value is less than the first threshold; and
    encode the first motion vector difference value sing a first golomb codeword when the first motion vector difference value is greater than or equal to the first threshold, and
  wherein the instructions that cause the processor to encode the second motion vector difference value using the second motion vector difference encoding scheme comprises instructions that cause the processor to:
    compare the second motion vector difference value to a second threshold value defined by the second encoding scheme;
    encode the second motion vector difference value using a second unary codeword when the second motion vector difference value is less than the second threshold; and
    encode the second motion vector difference value using a second golomb codeword when the second motion vector difference value is greater than or equal to the second threshold.

25. The non-transitory computer-readable storage medium of claim 23,
  wherein the instructions that cause the processor to encode the first motion vector difference value using the first motion vector difference encoding scheme comprises instructions that cause the processor to select a first context model to use to entropy encode the first motion vector difference value, wherein the first context model is associated with the first sub-pixel precision, and
  wherein the instructions that cause the processor to encode the second motion vector difference value using the second motion vector difference encoding scheme comprises instructions that cause the processor to select a second context model to use to entropy encode the second motion vector difference value, wherein the second context model is associated with the second sub-pixel precision.

26. A method of decoding video data, the method comprising:
  receiving an encoded prediction unit of a coding unit of video data that was encoded using a motion vector having one of a first sub-pixel precision or a second, different sub-pixel precision;
  receiving a context adaptive binary arithmetic coded indication of whether the motion vector has the first sub-pixel precision or the second sub-pixel precision;
  determining a context for decoding the indication, wherein determining the context comprises determining the context from at least one of a depth of the coding unit or a size of the prediction unit; and
  entropy decoding the indication using the determined context in accordance with context adaptive binary arithmetic coding.

27. The method of claim 26, wherein the first sub-pixel precision comprises one-quarter pixel precision, and wherein the second sub-pixel precision comprises one-eighth pixel precision.

28. The method of claim 26, wherein the coding unit has a size of 2N×2N pixels, and wherein the type for the prediction unit corresponds to the prediction unit having a size of one of 2N×2N pixels, 2N×N pixels, N×2N pixels, and N×N pixels, wherein N is an integer value greater than zero.

29. The method of claim 26, wherein the indication indicates that the motion vector has one-eighth pixel precision for luminance data of the coding unit, the luminance data corresponding to the prediction unit, the method further comprising:
calculating, using bilinear interpolation, values of one-sixteenth pixel positions of chrominance data of a reference block identified by the motion vector; and
decoding chrominance data of the coding unit based on the bilinear interpolated values of the reference block.

30. The method of claim 26, wherein the prediction unit comprises a first prediction unit, the method further comprising:
receiving a first motion vector difference value for the first prediction unit, the first motion vector difference value having the first sub-pixel precision;
decoding the first motion vector difference value using a first motion vector difference decoding scheme, wherein the first motion vector difference decoding scheme is associated with the first sub-pixel precision;
receiving a second motion vector difference value for a second prediction unit of the video data, the second motion vector difference value having the second sub-pixel precision; and
decoding the second motion vector difference value using a second motion vector difference decoding scheme, wherein the second motion vector difference decoding scheme is associated with the second sub-pixel precision.

31. The method of claim 30,
wherein decoding the first motion vector difference value using the first motion vector difference decoding scheme comprises:
receiving a first codeword representative of the first motion vector difference value;
determining whether the first motion vector difference value is less than a first threshold for the first motion vector difference decoding scheme;
decoding the first codeword as a first unary codeword when the first motion vector difference value is less than the first threshold; and
decoding the first codeword as a first golomb codeword when the first motion vector difference value is greater than or equal to the first threshold, and
wherein decoding the second motion vector difference value using the second motion vector difference decoding scheme comprises:
receiving a second codeword representative of the second motion vector difference value;
determining whether the second motion vector difference value is less than a second threshold for the second motion vector difference decoding scheme;
decoding the second codeword us a second unary codeword when the second motion vector difference value is les-s than the first threshold; and
decoding the second codeword as a second golomb codeword when the second motion vector difference value is greater than or equal to the first threshold.

32. The method of claim 31,
wherein determining whether the first motion vector difference value is less than the first threshold for the first motion vector difference decoding scheme comprises receiving information indicating whether the first motion vector difference value is less than the first threshold, and wherein determining whether the second motion vector difference value is less than the second threshold for the second motion vector difference decoding scheme comprises receiving information indicating whether the second motion vector difference value is less than the second threshold.

33. The method of claim 30, wherein the first motion vector difference decoding scheme is associated with one-quarter pixel precision, and wherein the second motion vector difference decoding scheme is associated with one-eighth pixel precision.

34. The method of claim 30,
wherein decoding the first motion vector difference value using the first motion vector difference decoding scheme comprises selecting a first context model to use to entropy decode the first motion vector difference value, wherein the first context model is associated with the first sub-pixel precision, and
wherein decoding the second motion vector difference value using the second motion vector difference decoding scheme comprises selecting a second context model to use to entropy decode the second motion vector difference value, wherein the second context model is associated with the second sub-pixel precision.

35. An apparatus for decoding video data, the apparatus comprising:
a memory configured to store video data; and
a video decoder configured to:
receive an encoded prediction unit of a coding unit of video data that was encoded using a motion vector having one of a first sub-pixel precision or a second, different sub-pixel precision,
receive a context adaptive binary arithmetic coded indication of whether the motion vector has the first sub-pixel precision or the second sub-pixel precision,
determine a context for decoding the indication, wherein the video decoder is configured to determine the context from at least one of a depth of the coding unit or a size of the prediction unit, and
entropy decode the indication using the determined context in accordance with context adaptive binary arithmetic coding.

36. The apparatus of claim 35, wherein the indication indicates that the motion vector has one-eighth pixel precision for luminance data of the coding unit, the luminance data corresponding to the prediction unit, wherein the video decoder is further configured to calculate, using bilinear interpolation, values of one-sixteenth pixel positions of chrominance data of a reference block identified by the motion vector, and decode chrominance data of the coding unit based on the bilinear interpolated values of the reference block.

37. The apparatus of claim 35, wherein the prediction unit comprises a first prediction unit, wherein the video decoder is configured to receive a first motor vector difference value for the first prediction unit, the first motion vector difference value having the first sub-pixel precision, decode the first motion vector difference value using a first motion vector difference decoding scheme, wherein the first motion vector difference decoding scheme is associated with the first sub-pixel precision, receive a second motion vector difference value for a second prediction unit of the video data, the second motion vector difference value having the second sub-pixel precision, and decode the second motion vector difference value using a second motion vector difference decoding scheme, wherein the second motion vector difference decoding scheme is associated with the second sub-pixel precision.

38. The apparatus of claim 36, wherein the decode the first motion vector difference value using the first motion vector difference decoding scheme, the video decoder is configured to receive a first codeword representative of the first motion vector difference value, determine whether the first motion vector difference value is less than a first threshold for the first motion vector difference decoding scheme, decode the first codeword as a first unary codeword when the first motion vector difference value is less than the first threshold, and decode the first codeword as a first golomb codeword when the first motion vector difference value is greater than or equal to the first threshold, and wherein to decode the second motion vector difference value using the second motion vector difference decoding scheme, the video decoder is configured to receive a second codeword representative of the second motion vector difference value, determine whether the second motion vector difference value is less than a second threshold for the second motion vector difference decoding scheme, decode the second codeword as a second unary codeword when the second motion vector difference value is less than the first threshold, and decode the second codeword as a second golomb codeword when the second motion vector difference value is greater than or equal to the first threshold.

39. The apparatus of claim 37, wherein the first motion vector difference decoding scheme is associated with one-quarter pixel precision, and wherein the second motion vector difference decoding scheme is associated with one-eighth pixel precision.

40. The apparatus of claim 37, wherein to decode the first motion vector difference value using the first motion vector difference decoding scheme, the video decoder is configured to select a first context model to use to entropy decode the first motion vector difference value, wherein the first context model is associated with the first sub-pixel precision, and wherein to decode the second motion vector difference value using the second motion vector difference decoding scheme, the video decoder is configured to select a second context model to use to entropy decode the second motion vector difference value, wherein the second context model is associated with the second sub-pixel precision.

41. The apparatus of claim 35, wherein the apparatus comprises at least one of:
   an integrated circuit;
   a microprocessor; or
   a wireless communication device that includes the video decoder.

42. An apparatus for decoding video data, the apparatus comprising:
   means for receiving an encoded prediction unit of a coding unit of video data that was encoded using a motion vector having one of a first sub-pixel precision or a second, different sub-pixel precision;
   means for receiving a context adaptive binary arithmetic coded indication of whether the motion vector has the first sub-pixel precision or the second sub-pixel precision;
   means for determining a context for decoding the indication, wherein the means for determining the context comprises means for determining the context from at least one of a depth of the coding unit or a size of the prediction unit; and
   means for entropy decoding the indication using the determined context in accordance with context adaptive binary arithmetic coding.

43. The apparatus of claim 42, wherein the indication indicates that the motion vector has one-eighth pixel precision for luminance data of the coding unit, the luminance data corresponding to the prediction unit, further comprising:
   means for calculating, using bilinear interpolation, values of one-sixteenth pixel positions of chrominance data of a reference block identified by the motion vector; and
   means for decoding chrominance data of the coding unit based on the bilinear interpolated values of the reference block.

44. The apparatus of claim 42, wherein the prediction unit comprises a first prediction unit, further comprising:
   means for receiving a first motion vector difference value for the first prediction unit, the first motion vector difference value having the first sub-pixel precision;
   means for decoding the first motion vector difference value using a first motion vector difference decoding scheme, wherein the first motion vector difference decoding scheme is associated with the first sub-pixel precision;
   means for receiving a second motion vector difference value for a second prediction unit of the video data, the second motion vector difference value having the second sub-pixel precision; and
   means for decoding the second motion vector difference value using a second motion vector difference decoding scheme, wherein the second motion vector difference decoding scheme is associated with the second sub-pixel precision.

45. The apparatus of claim 44,
   wherein the means for decoding the first motion vector difference value using the first motion vector difference decoding scheme comprises:
      means for receiving a first codeword representative of the first motion vector difference value;
      means for determining whether the first motion vector difference value is less than a first threshold for the first motion vector difference decoding scheme;
      means for decoding the first codeword as a first unary codeword when the first motion vector difference value is less than the first threshold: and
      means for decoding the first codeword as a first golomb codeword when the first motion vector difference value is greater than or equal to the first threshold, and
   wherein the means for decoding the second motion vector difference value using the second motion vector difference decoding scheme comprises:
      means for receiving a second codeword representative of the second motion vector difference value;
      means for determining whether the second motion vector difference value is less than a second threshold for the second motion vector difference decoding scheme;
      means for decoding the second codeword as a second unary codeword when the second motion vector difference value is less than the first threshold; and
      means for decoding the second codeword as a second golomb codeword when the second motion vector difference value is greater than or equal to the first threshold.

46. The apparatus of claim 44,
wherein the means for decoding the first motion vector difference value using the first motion vector difference decoding scheme comprises means for selecting a first context model to use to entropy decode the first motion vector difference value, wherein the first context model is associated with the first sub-pixel precision, and
wherein the means for decoding the second motion vector difference value using the second motion vector difference decoding scheme comprises means for selecting a second context model to use to entropy decode the second motion vector difference value, wherein the second context model is associated with the second sub-pixel precision.

47. A non-transitory computer-readable storage medium having stored thereon instructions that, when executed, cause a processor of a device for decoding video data to:
receive an encoded prediction unit of a coding unit of video data that was encoded using a motion vector having one of a first sub-pixel precision or a second, different sub-pixel precision;
receive a context adaptive binary arithmetic coded indication of whether the motion vector has the first sub-pixel precision or the second sub-pixel precision;
determine a context for decoding the indication, wherein the instructions that cause the processor to determine the context comprise instructions that cause the processor to determine the context from at least one of a depth of the coding unit or a size of the prediction unit; and
entropy decode the indication using the determined context in accordance with context adaptive binary arithmetic coding.

48. The non-transitory computer-readable storage medium of claim 47, wherein the indication indicates that the motion vector has one-eighth pixel precision for luminance data of the coding unit, the luminance data corresponding to the prediction unit, further comprising instructions that cause the processor to:
calculate, using bilinear interpolation, values of one-sixteenth pixel positions of chrominance data of a reference block identified by the motion vector; and
decode chrominance data of the coding unit based on the bilinear interpolated values of the reference block.

49. The non-transitory computer-readable storage medium of claim 47, wherein the prediction unit comprises a first prediction unit, further comprising instructions that cause the processor to:
receive a first motion vector difference value for the first prediction unit, the first motion vector difference value having the first sub-pixel precision;
decode the first motion vector difference value using a first motion vector difference decoding scheme, wherein the first motion vector difference decoding scheme is associated with the first sub-pixel precision;
receive a second motion vector difference value for a second prediction unit of the video data, the second motion vector difference value having the second sub-pixel precision; and
decode the second motion vector difference value using a second motion vector difference decoding scheme, wherein the second motion vector difference decoding scheme is associated with the second sub-pixel precision.

50. The non-transitory computer-readable storage medium of claim 49,
wherein the instructions that cause the processor to decode the first motion vector difference value using the first motion vector difference decoding scheme comprise instructions that cause the processor to:
receive a first codeword representative of the first motion vector difference value:
determine whether the first motion vector difference value is less than a first threshold for the first motion vector difference decoding scheme;
decode the first codeword as a first unary codeword when the first motion vector difference value is less than the first threshold; and
decode the first codeword as a first golomb codeword when the first motion vector difference value is greater than or equal to the first threshold, and
wherein the instructions that cause the processor to decode the second motion vector difference value using the second motion vector difference decoding scheme comprise instructions that cause the processor to:
receive a second codeword representative of the second motion vector difference value;
determine whether the second motion vector difference value is less than a second threshold for the second motion vector difference decoding scheme;
decode the second codeword as a second unary codeword when the second motion vector difference value is less than the first threshold; and
decode the second codeword as a second golomb codeword when the second motion vector difference value is greater than or equal to the first threshold.

51. The non-transitory computer-readable storage medium of claim 49,
wherein the instructions that cause the processor to decode the first motion vector difference value using the first motion vector difference decoding scheme comprise instructions that cause the processor to select a first context model to use to entropy decode the first motion vector difference value, wherein the first context model is associated with the first sub-pixel precision, and
wherein the instructions that cause the processor to decode the second motion vector difference value using the second motion vector difference decoding scheme comprise instructions that cause the processor to select a second context model to use to entropy decode the second motion vector difference value, wherein the second context model is associated with the second sub-pixel precision.

* * * * *